US012658344B2

(12) United States Patent
Hammig et al.

(10) Patent No.: US 12,658,344 B2
(45) Date of Patent: Jun. 16, 2026

(54) COPPER-ANF COMPOSITE CONDUCTOR FABRICATION

(71) Applicant: The Regents of the University of Michigan, Ann Arbor, MI (US)

(72) Inventors: Mark Hammig, Dexter, MI (US); Nicholas Kotov, Ann Arbor, MI (US); Jing Lyu, Beijing (CN); Suneel Joglekar, West Lafayette, IN (US)

(73) Assignee: The Regents of the University of Michigan, Ann Arbor, MI (US)

( * ) Notice: Subject to any disclaimer, the term of this patent is extended or adjusted under 35 U.S.C. 154(b) by 244 days.

Patent file contains an affidavit/declaration under 37 CFR 1.130(b).

(21) Appl. No.: 18/014,244

(22) PCT Filed: Jul. 1, 2021

(86) PCT No.: PCT/US2021/040078

§ 371 (c)(1),
(2) Date: Jan. 3, 2023

(87) PCT Pub. No.: WO2022/006390

PCT Pub. Date: Jan. 6, 2022

(65) Prior Publication Data

US 2023/0260680 A1 Aug. 17, 2023

Related U.S. Application Data

(60) Provisional application No. 63/046,920, filed on Jul. 1, 2020.

(51) Int. Cl.
*H01B 1/22* (2006.01)
*H01B 13/30* (2006.01)

(52) U.S. Cl.
CPC .............. *H01B 13/30* (2013.01); *H01B 1/22* (2013.01)

(58) Field of Classification Search
CPC ................................. H01B 13/30; H01B 1/22
See application file for complete search history.

(56) References Cited

U.S. PATENT DOCUMENTS

| | | | |
|---|---|---|---|
| 8,563,020 | B2 | 10/2013 | Uhlmann et al. |
| 9,324,472 | B2 | 4/2016 | Lee |
| 10,071,419 | B2 | 9/2018 | Tomonari et al. |
| 10,121,952 | B2 | 11/2018 | Talapin et al. |
| 10,160,833 | B2 | 12/2018 | Kotov |
| 2012/0171485 | A1 | 7/2012 | Lee |
| 2014/0066740 | A1 | 3/2014 | Taranekar et al. |
| 2017/0062786 | A1 | 3/2017 | Kotov |
| 2018/0174699 | A1 | 6/2018 | Kotov |
| 2019/0085139 | A1 | 3/2019 | Kotov et al. |

FOREIGN PATENT DOCUMENTS

| | | | |
|---|---|---|---|
| CN | 109438980 | A | 3/2019 |
| EP | 2319643 | A1 | 5/2011 |

OTHER PUBLICATIONS

International Preliminary Report on Patentability from International Patent Application No. PCT/US2021/040078, dated Dec. 13, 2022, 11 pages.
International Search Report and Written Opinion of the International Searching Authority from International Patent Application No. PCT/US2021/040078, dated Dec. 6, 2021, 14 pages.
A. Aziz et al., 1D copper nanowires for flexible printable electronics and high ampacity wires, Nanoscale 35; 2017, 13104-13111.
A. Bumajdad et al.; Cerium oxide nanoparticles prepared in self-assembled systems; Advances in Colloid and Interface Science 147, 2009, pp. 56-66.
A. Khan et al.; A chemical reduction approach to the synthesis of copper nanoparticles; Int. Nano Lett. 6, 2016, 21-26. DOI: 10.1007/s40089-015-0163-6.
A. Khan et al.; Scalable Solution-processed Fabrication Strategy for High-performance, Flexible, Transparent Electrodes with Embedded Metal Mesh; Journal of Visualized Experiments 124, 2017. DOI: 10.3791/56019.
A. V. Delgado et al.; Measurement and Interpretation of Electrokinetic Phenomena; Pure Appl. Chem., vol. 77, No. 10, p. 1753-1805, 2005. DOI: 10.1351/pac200577101753.
A.L. Serandour et al.; Decorporation of plutonium by pulmonary administration of Ca-DTPA dry powder: a study in rat after lung contamination with different plutonium forms; Radiat. Prot. Dosimetry 127, 2007, pp. 472-476.
Basu, J. et al.; Bulk Metallic Glasses: A New Class of Engineering Materials; Sadhana 2003, 28, pp. 783-798.
Bhattacharyya, S. K., An Assessment of Fuels for Nuclear Thermal Propulsion; Argonne National Laboratory, ANL/TD/TM01-22, 2001; 82 pp.
Burkes, D. E. et al., An Overview of Current and Past W-UO2 Cermet Fuel Fabrication Technology; Proceedings of Space Nuclear Conference 2007, MA, 2007; 12 pp.
C. Benmouhoub, et al., Synthesis and characterization of Cerium oxide (CeO2) Nanoparticles, Materials Science Forum vol. 609, 2009, pp. 189-194.
C.M. Barnes et al.; Fabrication process and product quality improvements in advanced gas reactor UCO kernels; 4th Int. Top. Meet. High Temp. React. Technol., American Society of Mechanical Engineers, 2008, pp. 177-188.

(Continued)

*Primary Examiner* — Haidung D Nguyen
(74) *Attorney, Agent, or Firm* — Lempia Summerfield Katz LLC

(57) ABSTRACT

A method of fabricating a conductor includes preparing an aramid nanofiber solution in which a matrix of aramid nanofibers is dispersed, preparing a dispersion of copper nanoparticles, each copper nanoparticle of the dispersion of cooper nanoparticles having an organic capping ligand attached to the copper nanoparticle, and incorporating copper nanoparticles of the dispersion of copper nanoparticles into the matrix of aramid nanofibers such that each incorporated copper nanoparticle is bonded to a respective aramid nanofiber of the matrix of aramid nanofibers via the organic capping ligand to which the copper nanoparticle is attached. The organic capping ligand may include a mercaptocarboxyiic acid.

31 Claims, 11 Drawing Sheets

(56) References Cited

OTHER PUBLICATIONS

D. Deng et al., Copper Nanoparticles: Aqueous Phase Synthesis and Conductive Film Fabrication at Low Sintering Temperature; ACS Appl. Mater. Interfaces 2013, 5, 3839-3846.
D.D. Sood, The role sol-gel process for nuclear fuels-an overview; J. Sol-Gel Sci. Technol. 59, 2011, pp. 404-416.
D.F. Bickford et al., Fabrication of Granule and Pellet Heat Sources from Oxalate-Based 238PuO2, Savannah River Laboratory, 1975, 37 pp.
European Search Report of the European Patent Office cited in corresponding patent application No. 21832458.0; Jan. 25, 2024; 7 pp.
G. Gorrasi et al.; Incorporation of carbon nanotubes into polyethylene by high energy ball milling: Morphology and physical properties; J. Polym. Sci., Part B: Polym. Phys. 2007, 45, pp. 597-606.
Haslett, R. A., Space Nuclear Thermal Propulsion Program Final Report, Grumman Aerospace Corporation, PL-TR-95-1064, 1995; 142 pp.
Inoue, A; Stabilization of metallic supercooled liquid and bulk amorphous alloys; Acta Mater. 2000, 48, pp. 279-306.
J. Chen et al.; A Versatile, Molecular Engineering Approach to Simultaneously Enhanced, Multifunctional Carbon-Nanotube-Polymer Composites; Adv. Funct. Mater. 2006, 16, pp. 114-119.
J. Katalenich, et al.; Fabrication of Cerium Oxide and Uranium Oxide Microspheres for Space Nuclear Power Applications; Proceedings of Nuclear and Emerging Technologies for Space, 2013; 9 pp.
J. Katalenich; Production of Monodisperse, Crack-Free Cerium Oxide Microspheres by Internal Gelation Sol-Gel Methods, University of Michigan Dissertation, 2014; 298 pp.
J. Lyu et al.; High Strength Conductive Composites with Plasmonic Nanoparticles Aligned on Aramid Nanofibers; Adv. Funct. Mater. 26, 2016, 8435-8445. DOI: 10.1002/adfm.201603230.
J.A. Phillips et al., Fabrication of uranium oxycarbide kernels and compacts for HTR fuel; Nucl. Eng. Des. 251, 2012, pp. 261-281.
J.L. Collins et al.; Production of Depleted UO2 Kernels for the Advanced Gas-Cooled Reactor Program for Use in Triso Coating Development, Oak Ridge National Laboratory, 2004; 57 pp.
Jancar, J. et al.; Current Issues in Research on Structure-Property Relationships in Polymer nanocomposites; Polymer 2010, 51, pp. 3321-3343.
Jing Lyu et al.; Stretchable conductors by kirigami patterning of aramid-silver nanocomposites with zero conductance gradient, Appl. Phys. Lett 111, 2017, pp. 161901.
Kango, S. et al.; Surface Modification of Inorganic Nanoparticles for Development of Organic-inorganic nanocomposites—A Review; Prog. Polym. Sci. 2013, 38, pp. 1232-1261.
Kumar, G. et al.; Bulk Metallic Glass: The Smaller the Better; Adv. Mater. 2011, 23, pp. 461-476.
Kumar, G. et al.; Nanomoulding with Amorphous Metals; Nature 2009, 457, 868-872.
L. He et al.; Facile synthesis of silver-decorated reduced graphene oxide as a hybrid filler material for electrically conductive polymer composites; RSC Adv. 2015, 5, pp. 15070-15076.
Lehao Liu et al.; Materials Engineering of High-Performance Anodes as Layered Composites with Self-Assembled Conductive Networks; J. Phys. Chem. C 2018, 122, 25, pp. 14014-14028.
M. Akay, et al.; Influence of Moisture on the Thermal and Mechanical Propeties of Autoclaved and oven-cured Kevlar-49/Epoxy laminates; Composites Science and Technology 51, 1997, pp. 565-571.
M. D. Tehrani et al.; A Novel Electromagnetic Actuation System for Magnetic Nanoparticle Guidance in Blood Vessels; IEEE Transactions on Magnetics 2014. DOI: 10.1109/TMAG.2014.2307271.
M. Iijima et al.; Non-aqueous colloidal processing route for fabrication of highly dispersed aramid nanofibers attached with Ag nanoparticles and their stability in epoxy matrixes; Colloids and Surfaces A: Physicochemical and Engineering Aspects 2015, 482, pp. 195-202.
M. Lee et al.; A Silver-Nanoparticle-Embedded Activated-Carbon-Pedot:PSS Composite Conductor for Enhancing Electrical Conductivity of a Gas Sensor Module; Digest Journal of Nanomaterials and Biostructures. vol. 13, No. 2, Apr.-Jun. 2018, p. 527-534.
M. Yang et al., Dispersions of Aramid Nanofibers: A New Nanoscale Building Block; ACS Nano 2011, 5, pp. 6945-6954.
Mark D. Hammig; Nanoscale Methods to Enhance the Detection of Ionizing Radiation, Current Topics in Ionizing Radiation Research, InTech, 2012, 24 pp.
N. D. Luong et al.; Graphene/cellulose nanocomposite paper with high electrical and mechanical performances; J. Mater. Chem. 2011, 21, pp. 13991-13998.
N. D. Luong, et al., Enhanced mechanical and electrical properties of polyimide film by graphene sheets via in situ polymerization; Polymer 2011, 52, pp. 5237-5242.
O'Brien, R. C. et al.; Recent Research Activities at the Center for Space Nuclear Research in Support of the Development of Nuclear Thermal Rocket Propulsion; Proceedings of Nuclear and Emerging Technologies for Space 2012, TX, 2012; 2 pp.
Olivier Lecarme et al.; Robust and Versatile Light Absorption at Near-Infrared Wavelengths by Plasmonic Aluminum Nanorods; ACS Photonics 2014, 1, pp. 538-546.
P. Bots et al., Formation of Stable Uranium(VI) Colloidal Nanoparticles in Conditions Relevant to Radioactive Waste Disposal, Langmuir 30, 2014, pp. 14396-14405.
P. Song et al.; Fabrication of exfoliated graphene-based polypropylene nanocomposites with enhanced mechanical and thermal properties; Polymer 2011, 52, pp. 4001-4010.
Powell, M.; Site Percolation in Randomly Packed Spheres; Phys. Rev. B 1979, 20, pp. 4194-4198.
R. P. I. Adler et al.; Characterization of Corrosion on Outdoor-Exposed Aluminum Metal-Matrix Composites as a a Function of Reinforcement Specie and Volume Fraction; 2008 ARL-TR-4372, U.S. Army Research Laboratory, 52 pp.
R.C. O'Brien et al.; Spark Plasma Sintering of W-UO2 cermets, J. of Nuclear Materials 433, 2013, pp. 50-54.
Rodney D. Hunt et al., Uranium kernel formation via internal gelation; Radiochim. Acta 92, 2004, pp. 909-915.
S. Joglekar et al.; High-Energy Photon Spectroscopy Using All Solution-Processed Heterojunctioned Surface-Modified Perovskite Single Crystals; ACS Appl. Mater. Interfaces, vol. 11, No. 36, 2019, 33399-33408. DOI: 10.1021/acsami.9b09381.
S. Vadukumpully et al.; Flexible conductive graphene/poly(vinyl chloride) composite thin films with high mechanical strength and thermal stability; Carbon 2011, 49, pp. 198-205.
S.S. Ting et al.; Cellular uptake and activity of heparin functionalised cerium oxide nanoparticles in monocytes, Biomaterials 34, 2013, pp. 4377-4386.
Sanchez, C. et al.; Applications of Hybrid Organic-inorganic nanocomposites; J. Mater. Chem. 2005, 15, pp. 3559-3592.
Schuster, B. E. et al.; Bulk and Microscale Compressive Properties of a Pd-Based Metallic Glass; Scr. Mater. 2007, 57, pp. 517-520.
Thomas Christopher et al., Manufacturing of Low-Background Copper Electrical Components for Rare-Event Detection, Galt LLC Final Technical Report, Jan. 2019, 74 pp.
X. Tang et al.; A simple way of preparing high-concentration and high-purity nano copper colloid for conductive ink in inkjet printing technology; Colloids and Surfaces A: Physicochem. Eng. Aspects 360, 2010; pp. 99-104.
X. Wang et al.; Electrically conductive and mechanically strong biomimetic chitosan/reduced graphene oxide composite films; J. Mater. Chem. 2010, 20, pp. 9032-9036.
Y. Kim et al.; Stretchabel nanoparticle conductors with self-organized conductive pathways; Nature 500, 2013, 59-63. DOI: 10.1038/nature12401.
Y. Li et al.; Thermal analysis of Cu-organic composite nanoparticles and fabrication of highly conductive copper films; Journal of Alloys and Compounds 649, 2015, 1156-1163. DOI: 10.1016/j.allcom. 2015.07.248.
Zhao, J.; Effect of Surface Treatment on the Structure and Properties of Para-Aramid Fibers by Phosphoric Acid; Fibers Polym. 2013, 14, pp. 59-64.
Office Action from European Patent Application No. 21832458.0, dated Jan. 3, 2025, 5 pages.

COPPER-ANF COMPOSITE CONDUCTOR FABRICATION

CROSS-REFERENCE TO RELATED APPLICATION

This U.S. National Phase application is based on International Application No. PCT/US2021/040078, filed Jul. 1, 2021, which claims the benefit of U.S. provisional application entitled "Copper-ANF Composite Conductor Fabrication," filed Jul. 1, 2020, and assigned Ser. No. 63/046,920, the entire disclosures of which are hereby expressly incorporated by reference. Priority benefit of these earlier filed applications is hereby claimed.

STATEMENT REGARDING FEDERALLY SPONSORED RESEARCH OR DEVELOPMENT

This invention was made with government support under Contracts Nos. HDTRA1-11-1-0050, HDTRA1-13-C-0050, and HDTRA1-12-1-0038 awarded by the Defense Threat Reduction Agency. The government has certain rights in the invention.

BACKGROUND OF THE DISCLOSURE

Field of the Disclosure

The disclosure relates generally to nanocomposite materials and nanoparticle-based structures.

Brief Description of Related Technology

Amorphous metals combine high mechanical and electrical properties. The absence of crystallites, grain boundaries, and dislocations in the amorphous structure results in a homogeneous and isotropic material, which displays very high strength, elastic strain limit, corrosion resistance, and in some cases, substantial ductility. However, the strength of amorphous metals decreases rapidly with increased temperature. In addition, the physical dimensions of amorphous metals are limited to small flakes or disk-shaped foils. Their chemical constituents usually include noble metals such as gold (Au), paladium (Pd), and platinum (Pt). They are often difficult to process, particularly when complex shapes are demanded. Furthermore, the electrical conductivity of amorphous materials is lower than that of crystalline materials with identical compositions.

Hybrid organic-inorganic nanocomposites have been used to address these challenges. The incorporation of conductive nanometer-scale fillers into elastomeric polymer matrices has generated high performance composites with technologically promising combinations of mechanical and electrical properties. The properties of the composite material are highly sensitive to the shape, content and dispersion of the fillers. In addition, the intrinsic performance and structure of the polymer matrix impacts the electrical and mechanical properties of the composite material. Metal nanoparticles (NPs) have been considered for use in such composites because of their high electrical conductivity and multiple surface functionalities.

Gold (Au) and silver (Ag) NPs have been used in combination with polymers to create nanocomposite materials for biological and chemical sensing or catalysis. However, the metal NP content in these composite materials is usually low. Some methods of composite preparations exemplified by layer-by-layer (LBL) assembly lead to composites with high loading of Au NPs to realize high electrical conductivity.

Flexible, lightweight conductors provide advantages over traditional metal elements in terms of improved mechanical properties, chemical stability, and improved operating environments. The lightweight conductors have been composed of conductive nanoparticles, either attached to a nanofiber scaffold or dispersed in a polymer. The improved mechanical properties include increased toughness and mechanical flexibility. A main drawback of these composite conductors is their use of noble metals (e.g., Ag, Au), which add to the material cost of these composites and limit use to special applications.

SUMMARY OF THE DISCLOSURE

In accordance with one aspect of the disclosure, a method of fabricating a conductor includes preparing an aramid nanofiber solution in which a matrix of aramid nanofibers is dispersed, preparing a dispersion of copper nanoparticles, each copper nanoparticle of the dispersion of cooper nanoparticles having an organic capping ligand attached to the copper nanoparticle, and incorporating copper nanoparticles of the dispersion of copper nanoparticles into the matrix of aramid nanofibers such that each incorporated copper nanoparticle is bonded to a respective aramid nanofiber of the matrix of aramid nanofibers via the organic capping ligand to which the copper nanoparticle is attached. The organic capping ligand includes a mercaptocarboxylic acid.

In accordance with another aspect of the disclosure, a method of fabricating a conductor includes preparing an aramid nanofiber solution in which a matrix of aramid nanofibers is dispersed, preparing a dispersion of copper nanoparticles, each copper nanoparticle of the dispersion of cooper nanoparticles having an organic capping ligand attached to the copper nanoparticle, and incorporating copper nanoparticles of the dispersion of copper nanoparticles into the matrix of aramid nanofibers such that each incorporated copper nanoparticle is bonded to a respective aramid nanofiber of the matrix of aramid nanofibers via the organic capping ligand to which the copper nanoparticle is attached. Preparing the dispersion of copper nanoparticles includes establishing a first pH for the dispersion during nanoparticle growth, and adjusting the dispersion from the first pH to a second pH after the nanoparticle growth in preparation for incorporating the plurality of copper nanoparticles into the matrix of aramid nanofibers, the second pH being lower than the first pH.

In accordance with yet another aspect of the disclosure, a method of fabricating a conductive wire includes preparing an aramid nanofiber solution in which a matrix of aramid nanofibers are dispersed, preparing a dispersion of copper nanoparticles, each copper nanoparticle of the dispersion of copper nanoparticles having an organic capping ligand attached to the copper nanoparticle, injecting the dispersion of copper nanoparticles into a stream of the aramid nanofiber solution to form a composite stream in which copper nanoparticles of the dispersion of metal nanoparticles are incorporated into the matrix of aramid nanofibers such that each incorporated copper nanoparticle is bonded to a respective aramid nanofiber of the matrix of aramid nanofibers via the organic capping ligand to which the copper nanoparticle is attached, releasing the composite stream into a hydrolyzing solution to form a composite structure, and forming the conductive wire from the composite structure.

In accordance with still another aspect of the disclosure, a conductor includes a framework including a matrix of aramid nanofibers, a distribution of copper nanoparticles supported by the framework, and a plurality of organic capping ligands, each organic capping ligand of the plurality of organic capping ligands bonding a respective copper nanoparticle of the distribution of copper nanoparticles to a respective aramid nanofiber of the matrix of aramid nanofibers. Each organic capping ligand of the plurality of organic capping ligands includes a mercaptocarboxylic acid.

In accordance with still another aspect of the disclosure, a method of fabricating a detector includes preparing an aramid nanofiber solution in which a matrix of aramid nanofibers are dispersed, preparing a dispersion of semiconductor nanoparticles, preparing a dispersion of copper nanoparticles, incorporating copper nanoparticles of the dispersion of copper nanoparticles into the matrix of aramid nanofibers to form a conductive layer, and incorporating semiconductor nanoparticles of the dispersion of semiconductor nanoparticles into the matrix of aramid nanofibers to form a detector layer adjacent to the conductive layer.

In accordance with still another aspect of the disclosure, a detector includes a substrate including a matrix of aramid nanofibers, a distribution of copper nanoparticles bonded to the matrix of aramid nanofibers to define a conductive layer of the substrate, and a distribution of semiconductor nanoparticles bonded to the matrix of aramid nanofibers to define a detector layer of the substrate. The conductive layer is disposed adjacent to the detector layer to capture charges generated by photons or particles incident upon the detector layer.

In connection with any one of the aforementioned aspects, the conductors, detectors, devices, systems, and/or methods described herein may alternatively or additionally include or involve any combination of one or more of the following aspects or features. The mercaptocarboxylic acid includes mercaptosuccinic acid. Preparing the dispersion of copper nanoparticles includes lowering a pH of the dispersion in preparation for incorporating the plurality of copper nanoparticles into the matrix of aramid nanofibers. The pH is lowered to between about 7 and about 8. Incorporating the copper nanoparticles includes coating a substrate with the aramid fiber solution using a spin coating process, and implementing a vacuum filtration procedure in which the film is disposed as a filtration membrane. Incorporating the copper nanoparticles includes coating a substrate with the aramid fiber solution using a blade to form a film, and implementing a vacuum filtration procedure in which the film is disposed as a filtration membrane. The method further includes forming a conductive structure from the film after incorporating the copper nanoparticles. Forming the conductive structure includes drawing the film onto a spool. Incorporating the copper nanoparticles includes releasing the aramid fiber solution as a stream in a hydrolyzing solution to form a wire, and soaking the wire in the dispersion of copper nanoparticles. Incorporating the copper nanoparticles includes injecting the dispersion of copper nanoparticles into a stream of the aramid nanofiber solution provided by a first needle such that a composite stream is defined by the first needle, and injecting the composite stream into a stream of a hydrolyzing solution to define a thread in the hydrolyzing solution. The method further includes forming a conductive wire from the defined thread after incorporating the copper nanoparticles. Forming the conductive wire includes drawing the conductive wire onto a spool. Preparing the dispersion of copper nanoparticles includes curing the dispersion of copper nanoparticles after the nanoparticle growth. Incorporating the copper nanoparticles includes coating a substrate with the aramid fiber solution using a blade to form a film, and implementing a vacuum filtration procedure in which the film is disposed as a filtration membrane. The method further includes forming a conductive structure from the film after incorporating the copper nanoparticles. Forming the conductive structure includes drawing the film onto a spool. Incorporating the copper nanoparticles includes coating a substrate with the aramid fiber solution using a spin coating process, and implementing a vacuum filtration procedure in which the film is disposed as a filtration membrane. Incorporating the copper nanoparticles includes releasing the aramid fiber solution as a stream in a hydrolyzing solution to form a wire, and soaking the wire in the dispersion of copper nanoparticles. Incorporating the copper nanoparticles includes injecting the dispersion of copper nanoparticles into a stream of the aramid nanofiber solution provided by a first needle such that a composite stream is defined by the first needle, and injecting the composite stream into a stream of a hydrolyzing solution to define a thread in the hydrolyzing solution. The method further includes forming a conductive wire from the defined thread after incorporating the copper nanoparticles. Forming the conductive wire includes drawing the conductive wire onto a spool. Preparing the dispersion of copper nanoparticles includes curing the dispersion of copper nanoparticles after the nanoparticle growth. Curing the dispersion of copper nanoparticles is implemented after adjusting the dispersion to the second pH. The second pH is between about 7 and about 8. The organic capping ligand includes a mercaptocarboxylic acid. The mercaptocarboxylic acid includes mercaptosuccinic acid. The organic capping ligand includes a thiol group and a carboxyl group. The organic capping ligand includes a hydroxyl group, carboxyl group, an amine group, a thiol group, or any combination thereof. The method further includes preparing a dispersion of semiconductor nanoparticles, and incorporating semiconductor nanoparticles of the dispersion of semiconductor nanoparticles into the matrix of aramid nanofibers to form a sensor layer. The sensor layer is adjacent to the conductor formed by incorporating the copper nanoparticles into the matrix of aramid nanofibers. Releasing the composite stream includes injecting the composite stream into a stream of the hydrolyzing solution. The hydrolyzing solution includes a further dispersion of copper nanoparticles. The further dispersion of copper nanoparticles is diluted relative to the prepared dispersion of copper nanoparticles. Forming the conductive wire includes drawing the conductive wire onto a spool. The distribution of copper nanoparticles is spatially non-uniform in the matrix of aramid nanofibers across a cross-section of the framework such that an exterior of the framework is insulating and an interior of the framework is conductive. The framework is wire-shaped.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 9:
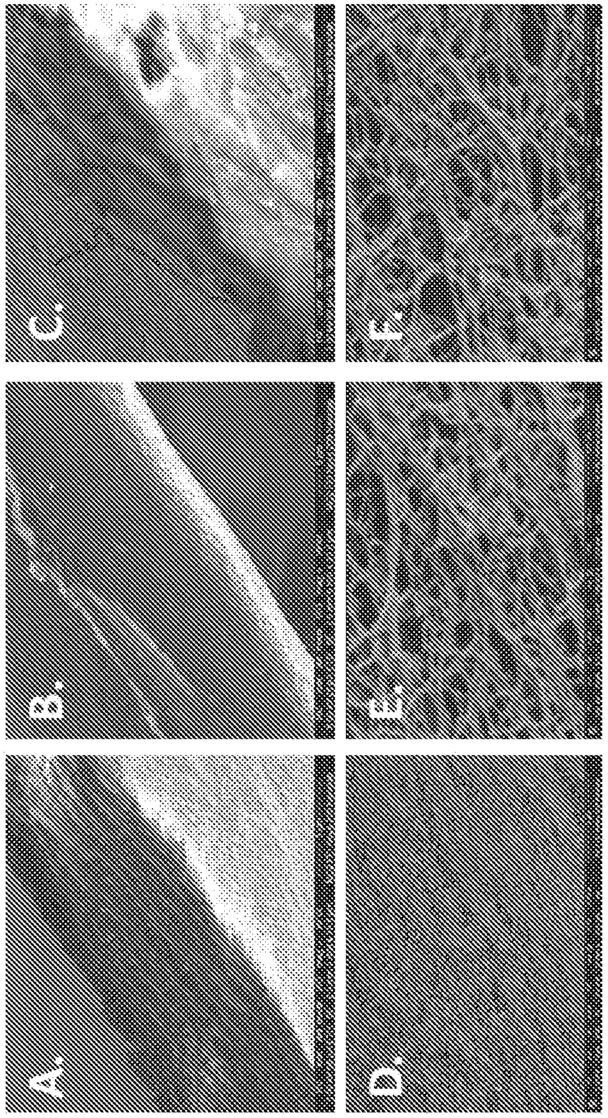

FIG. 9 depicts scanning electron microscopy (SEM) images of the surface of a Cu NP/ANF composite conductor prepared by critical-point drying, showing, in image A and image B, regions with Cu NPs coating the ANF nanofiber superstructure, in addition to areas where thicker layers of Cu NPs coat the ANF surface, in the form of amorphous Cu NP clusters (shown in image C and image D) or thin NP plates (shown in image E). Image F is a higher-magnification SEM micrograph of a region of the image E, showing the incorporation of Cu NPs into the nanofibrous ANF superstructure.

Figure 10:
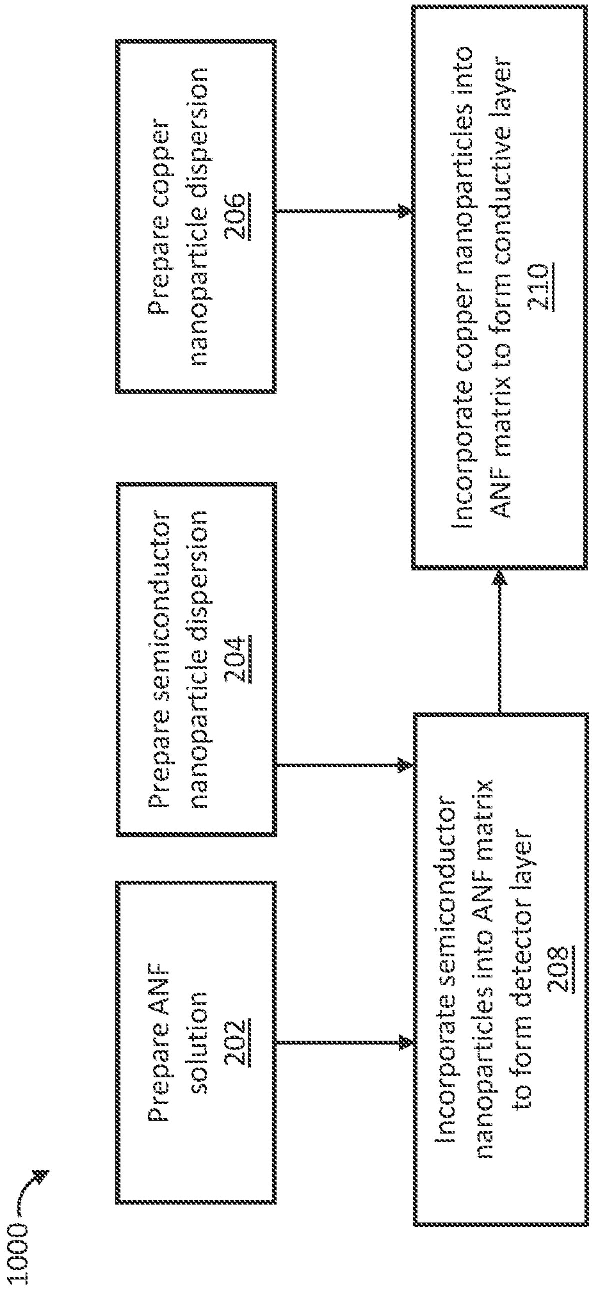

FIG. 10 is a flow diagram of a method of fabricating a detector in which copper nanoparticles and semiconductor nanoparticles are incorporated to form a conductive layer and a detector layer, respectively, in accordance with one example.

Figure 11:
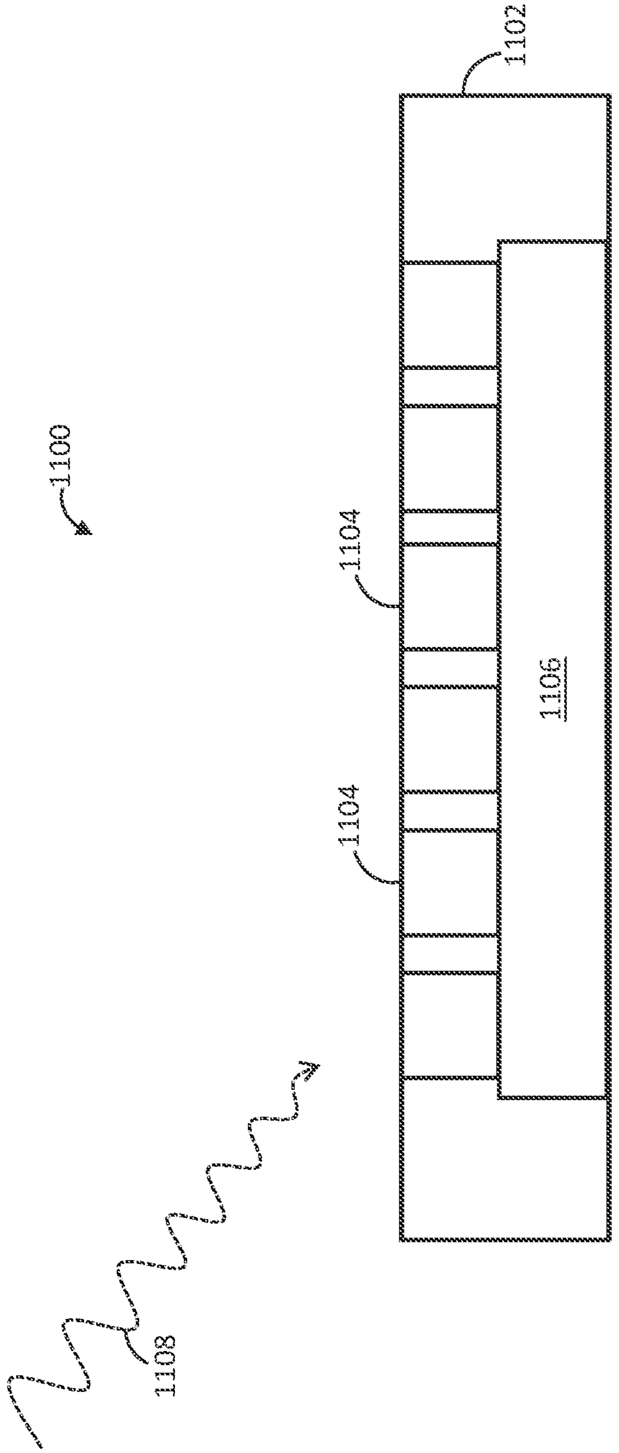

FIG. 11 is a cross-sectional, schematic view of a detector having distributions of copper nanoparticles and semiconductor nanoparticles bonded to a matrix of aramid nanofibers in accordance with one example.

The embodiments of the disclosed conductors, detectors, devices, systems, and/or methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

The disclosed methods, conductors, detectors, and other devices and systems are directed to lightweight ultrastrong stretchable conductive composite films from metallic nanoparticles and aramid nanofibers. Large volumetric fractions of copper (Cu) nanoparticles (NPs) are incorporated into a porous aramid nanofiber matrix to realize films that have high electrical conductivity, yet maintain superior mechanical strength, properties that are usually hard to achieve simultaneously. Furthermore, the composite films and other structures demonstrate excellent flexibility, which is superior to other related classes of reported flexible conductors including carbon-based nanomaterials (CNTs and graphene) and other metallic nanomaterials. The unique network structure enables high electrical conductivity and robust mechanical behavior of the metal-ANF structures.

The disclosed methods, conductors, detectors, and other devices and systems use a high-strength, temperature resilient polymer based on Kevlar to confer the mechanical properties to the overall composite. This approach stands in contrast to the fabrication of solid blocks of NPs without any support matrix, e.g., by simply pour-casting into a mold, which might be appropriate for thermal and shielding components. Instead, the disclosed devices and methods address the challenges of incorporating the NPs into the nanofiber matrix. Aramid nanofibers (ANFs) are useful as the host polymer matrix because, for instance, ANFs have exceptional mechanical performance (e.g., stiffness 109 GPa and strength 3.6 GPa), excellent chemical and thermal stability, and abundant amide functional groups. The use of ANFs supports a reduction in the mass density of the conductors via an increase in porosity, rather than, for instance, reduction in the size of the nanoparticles.

The oxidation of the copper presents further challenges. One of the main issues with using nanoparticles of more abundant metals, such as Cu, is their high reactivity and low environmental stability. Their surfaces are thus passivated with a ligand. While these ligands may be readily available, high-temperature post-processing is often involved to obtain low-resistivity films, for which ligand removal is often warranted. This process is capable of damaging the scaffold material and negate many of the mechanical advantages of the composite conductors. High-temperature sintering is also capable of causing oxidation of the copper nanoparticles which itself increases the resistivity, though this oxidation may be reversed during the sintering process by the presence of certain organic capping ligands, allowing a resistivity below, for instance, $1\times10^{-7}$ Ωm, within an order of magnitude of bulk copper ($1.72\times10^{-8}$ Ωm).

The disclosed methods are directed to the fabrication of free standing, flexible, ultrathin, and lightweight conductors having copper nanoparticles grafted upon a Kevlar-based aramid nanofiber matrix. In some cases, that combination is realized through a coating procedure (e.g., blade or spin coating) followed by incorporation of metal NPs through vacuum filtration. The fabrication process is more effective than other fabrication techniques, such as layer-by-layer assembly. In addition, the porous structure of the ANF films allows high volume loading of the copper NPs to form an interconnected three-dimensional conductive network that increases conductivity performance while decreasing overall mass of the conductor because of its porous construction.

The disclosed methods are configured to support (1) the production of a stable colloidal solid structure with minimal or negligible oxidation and the desired NP size and shape, (2) the bonding of the NPs together during the transformation from a colloidal liquid to a self-assembled solid, and (3) the bonding of the NPs to the polymer such that the material is stable and robust.

The disclosed methods may be used to fabricate conductive films, wires, and other conductive structures. The conductive structures are well suited for a variety of applications. For instance, the conductors may be used as multifunctional electrical cabling and/or electrical interconnects in spacecraft or aircraft. The conductors may provide high conductivity and power-handling capability with at least an order of magnitude lower mass, a weight reduction that frees up precious space resources and increase the scientific and operational capabilities of the craft. The disclosed conductors may be multi-use and cross-cutting for a broad range of space applications, including space mission applications that include planetary surface power, large-scale spacecraft prime power, small-scale robotic probe power, and small satellite power. In aeronautical applications, the disclosed conductor may be used to efficiently distribute power to aircraft propulsors with minimal mass overhead associated with the cabling.

Although described herein in connection with spacecraft and aircraft applications, the disclosed conductors are useful in connection with a wide range of other applications, including, for instance, various low-voltage, or low-power, applications. For instance, one such application is to use the flexible composite conductor in low-voltage power busses and other systems. Other applications may be high power systems, in which case the disclosed conductors may be configured with a conducting/insulating arrangement, as described herein. Still other applications involve use of the conductors in (1) conductive copper-based inks for 3D additive manufacturers, (2) low-mass, highly robust battery electrodes (robust to thermal cycling), and (3) high-reliability interconnects. Some of these and other applications may benefit from the metal-polymer composite nature of the disclosed conductors. Taking the battery electrode example, the product is lower weight because one-half to one-tenth as much copper is used relative to, e.g., a 40 micrometer thick copper electrode, the current standard, because the porous polymer is much stronger than pure copper and the overall composite may therefore be made thinner as well as less dense while achieving a desired level of conductivity. Furthermore, the strength of the bonding in the composite structure results in temperature and mechanical resilience far superior to thin-film copper of equivalent thickness. As a result, the electrode may be less expensive and more robust under, for instance, operational cycling.

The shape or form factor of the disclosed conductors is not limited to a wiring or cabling form factor. The disclosed conductors may be cut or otherwise formed into a variety of wiring configurations and other shapes. Various conductors having high conductivity and minimal mass may be formed.

The disclosed methods may be also used to fabricate devices having a conductive film or other conductive structure as an integral component thereof. For instance, a device for particle and/or photon detection may be fabricated. The detector device may include a matrix of aramid nanofibers having a conductive layer and a detector layer adjacent the conductive layer. The conductive layer has copper NPs incorporated therein, and the detector layer has semiconductor NPs incorporated therein. The conductive layer may serve as an electrode and/or contact of the detector device.

Examples of the synthesis of the copper nanoparticles and post-processing of the conductive films or other structures are now addressed. One method for synthesis of copper nanoparticles involves aqueous reduction of $Cu^{2+}$ cations by a reducing agent in the presence of one or more coordinating complexes (e.g., a complexing agent ligand). The coordinating complex may or may not involve the ligand eventually used for bonding to the ANF matrix. One example reducing agent is hydrazine, though other agents, such as ascorbic acid, may be used as an effective reducing agent. In these example synthesis techniques, the cupric salt is dissolved into ultrapure water (e.g., Millipore-filtered deionized water with a resistivity of ~18 MΩ-cm to ensure minimal dissolved ions), either with the complexing agent dissolved in the water before addition of the cupric salt or shortly thereafter. Upon dissolution, the complexing agent forms coordinating complexes with the cupric cations. The solution may be mixed under vigorous stirring for about 30 minutes to ensure complete dissolution and coordination of the cupric cations with the salt. The reducing agent may then be added, which temporarily replaces the complexing agent ligands and reducing the cupric cations into neutral copper atoms.

The growth of copper nanoparticles from the individual copper atoms follows a solution-based crystal growth process. As the copper atoms get closer to each other, the Lennard-Jones potential favors interaction of the copper atoms and growth of the nanoparticles. Because the reaction rate is Arrhenius, that is, exponentially dependent on the reaction temperature, the temperature may be controlled to ensure the formation of the correct concentration of distantly-separated nucleates. In some cases, the concentration of these initial, distantly-separated nucleates may be uniform throughout the solution, which is why vigorous stirring of the solution may be implemented. The nucleates serve as seeds for the eventual growth of the nanoparticles, and their concentration immediately after nucleation may be proportional to the original cupric cation concentration, with the proportionality factor being dependent on the final desired nanoparticle size.

Following nucleation, the nucleates grow at a rate proportional to solution concentration and temperature. For copper in aqueous solutions, the solubility increases with temperature, so the reaction is self-limiting in a sense. As growth proceeds, the copper concentration decreases. Higher temperatures increase the solubility of copper in the solution, and along with a faster growth rate, the copper concentration quickly drops to the saturation point, after which nanocrystal growth stops. To ensure uniform-sized nanoparticles, nucleation may occur quickly throughout the solution, and afterwards the temperature may be quickly increased to a desired set-point. The desired set-point may be determined from the original cation concentration, the reduction rate of the cations (itself determined by the temperature and amount of reducing agent injected into the solution), and the growth kinetics of the reaction. The growth recipe may be determined empirically.

During nanocrystal growth, Lennard-Jones interaction between nanocrystals may also occur. The ability to resist the electrostatic interaction between nanoparticles is referred to as the zeta potential, with the ideal zeta potential being at least twice the thermal potential of 26 mV. Colloids with higher zeta potentials are more stable over time, while lower zeta potential colloids rapidly experience coagulation, sedimentation, or flocculation. While it is possible to screen electrostatic interactions between nanoparticles through the use of long-chained ligands, their presence increases the potential barrier between nanoparticles in the resulting nanoparticle composite film, and involve higher-temperature sintering or careful solution extraction for removal. The zeta potential is adjusted by establishing a desired pH level of the colloidal solution. This may be achieved by raising the pH of the solution during the nucleation and growth phases by the addition of sodium hydroxide (NaOH). The colloidal nanoparticle mixtures may be stable over many days or longer, e.g., over weeks.

After the final growth of the nanocrystals, ligands may be attached to the nanoparticles. The ligands may be used to improve solution stability and/or to aid nanocrystal bonding to the polymer scaffold of the composite material. The ligands may be attached either by adding a different ligand to the nanoparticle colloidal mixture after nucleation and growth, or by utilizing a multi-functional ligand that binds to both the copper nanoparticles and to the cupric cations. In some cases, the multi-functional ligand approach is used in connection with mercaptosuccinic acid. Mercaptosuccinic acid and/or other ligands as described herein may thus be used for both the formation of copper complexes and for functionalizing the copper nanoparticle.

The nanoparticles may then be incorporated into an ANF scaffold or framework in multiple ways. In some cases, for example, the nanoparticle colloidal mixture is flowed through an ANF film. The ligand-capped nanoparticles attach to the scaffold or framework of the ANF film through bonding between the ligand and the scaffold. Other techniques involve soaking an ANF structure in the nanoparticle colloidal mixture or injection of the nanoparticle mixture into a stream of an ANF solution, as described herein.

An anneal (e.g., a high temperature anneal) may be used to obtain a desired level of conductivity. The annealing temperature may be limited by decomposition of the ANF scaffolding material. High-temperature sintering may be used to remove some or all of the capping ligands, and/or reverse oxidation occurring during nanoparticle synthesis. Sintering may address a high ligand surface concentration that restricts dot-to-dot conductivity to a degree (e.g., depending on ligand length). One way to lower the ligand surface concentration is to vaporize the ligand via heating at a temperature high enough to evaporate the ligand but not high enough to damage the ANF or the nanoparticles.

Additional or alternative techniques may be used. For instance, another way to reduce the ligand concentration is via control of the colloidal solution (e.g., pH and/or temperature control). A lower ligand concentration may result in closer packed particles during solidification. In one example, Cu nanoparticle composites are sintered in an inert argon atmosphere, e.g., at a slower heating rate of 5° C. per minute. The oxide phases (CuO, $Cu_2O$) are present in the samples annealed at both low temperature (e.g., 280° C.) and at high temperature (e.g., 700° C.), but the oxide phases are far less prominent at the higher temperature, showing a reduction of oxide phases at higher-temperature sintering. Use of a higher heating rate may suppress oxide phases at both low and high temperature sintering. After high-temperature sintering, the presence of oxide phases was found to be negligible. The use of a mechanically-strong, high-temperature stable scaffolding material is therefore desirable. The conductors disclosed herein may be formed with or without annealing, sintering, or other heating.

Figure 1:
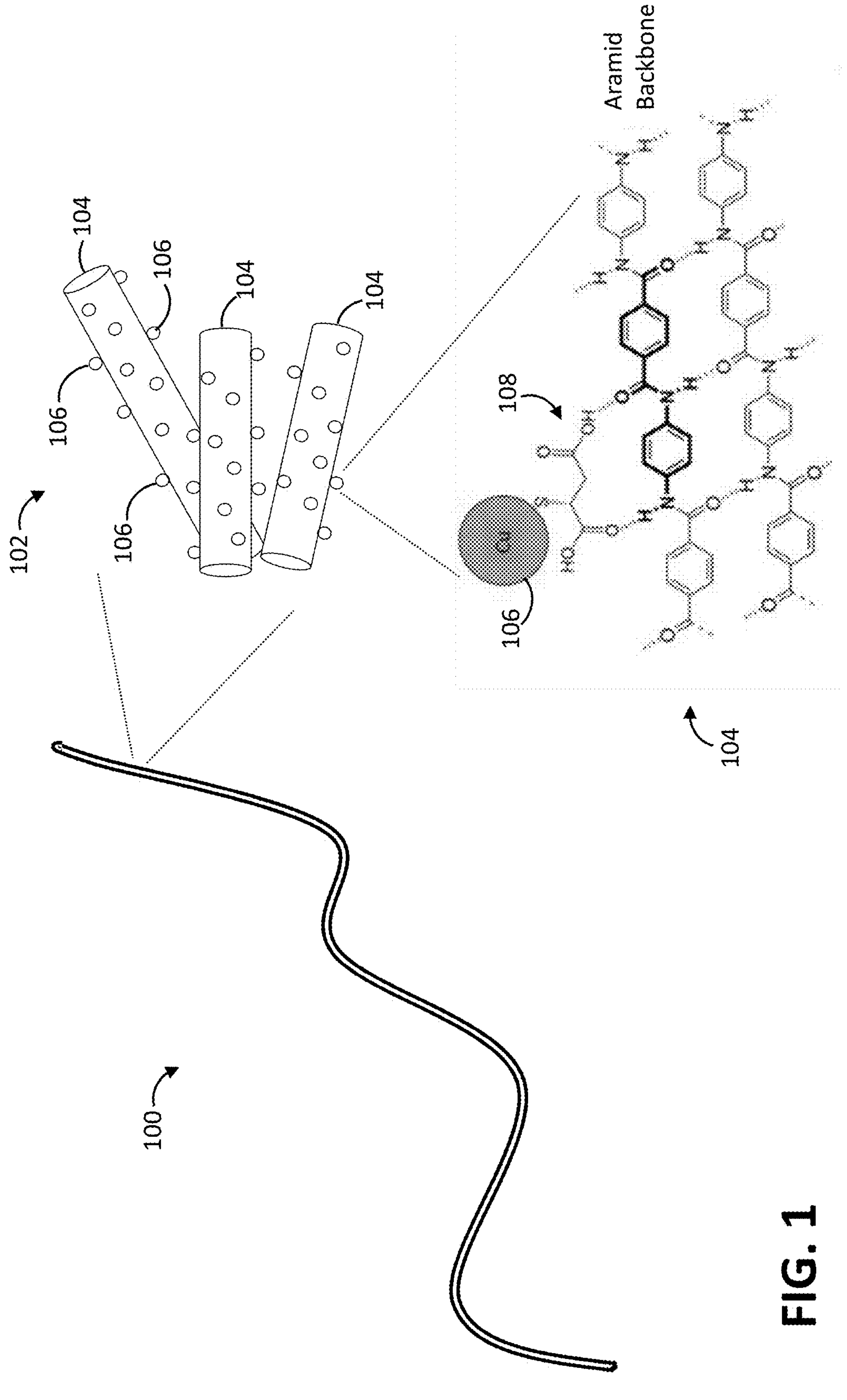
FIG. 1 is a schematic view of a wire-shaped conductor having copper nanoparticles distributed across, and support by, a matrix of aramid nanofibers in accordance with one example.

FIG. 1 schematically depicts a conductor 100 having a nanocomposite structure or framework 102 in accordance with one example. The conductor 100 may be configured as a wire, cable, or other conductive structure. In this example, the framework 102 is wire-shaped. The nanocomposite structure or framework 102 includes a matrix of aramid nanofibers (ANF) 104. The nanocomposite structure or framework 102 may be fabricated from an ANF film (e.g., via dicing) or as a wire-shaped structure, as described herein, or via another process.

The ANF nanofibers 104 and the resulting nanocomposite structure 102 may be grown or formed as described in U.S. Patent Publications Nos. 2013/0288050 ("Synthesis and use of aramid nanofibers") and 2019/0085139 ("Gels and nanocomposites containing ANFs"), the entire disclosures of which are hereby incorporated by reference. Additional or alternative techniques may be used to form the ANF nanofibers 104 and the nanocomposite structure 102. The dimensions, size, shape, composition, and other characteristics of the nanofibers 104 may also vary. Further details regarding the composition and other characteristics of the nanofibers 104 are set forth below and in the above-referenced publications.

The matrix of ANF nanofibers 104 provide a framework or scaffolding that confers excellent strength and temperature-resilience through, e.g., the ring-chain aromatic groups shown in the schematic of FIG. 1. Furthermore, the nanofiber matrix itself provides the template upon which the NPs are grafted. As shown in FIG. 1, hydrogen bonding to the nanofiber backbone is regularized because of the repeated bonding sites of the polymer, which assists in forming conductive paths throughout the structure.

The conductor 100 further includes a distribution of copper nanoparticles 106 across the matrix of aramid nanofibers 104. The distribution of the copper nanoparticles 106 may or may not be uniform across the conductor 100. The nanoparticles 106 may thus be distributed randomly across each nanofiber 104 in some cases. The schematic arrangement shown in FIG. 1 is shown for ease in illustration. In other cases, the distribution of copper nanoparticles 106 may vary across the cross-section of the conductor 100. For instance, the interior of the conductor 100 may have a higher concentration than an exterior of the conductor 100. For example, the exterior of the conductor 100 may have a sufficiently low concentration of the copper nanoparticles 106 so as to be insulating. Further details regarding the synthesis, incorporation, and bonding of the nanoparticles 106 are provided below in connection with a number of examples.

Each aramid nanofiber 104 may include a fiber backbone. The nanoparticles 106 may be aligned along the backbones, as described further hereinbelow. Such alignment may be useful for achieving a desired level of conductivity.

The nanoparticles 106 may be sized to achieve a desired level of conductivity. In some cases, at least some nanoparticles 106 of the distribution of nanoparticles 106 have a diameter of about six nanometers, but a wide range of other diameters may be used. The nanoparticles may be sized in accordance with an interest in avoiding trapping in the ANF matrix pores during fluidic transport of the nanoparticles. If the nanoparticles are too big relative to the pore size (e.g., the nanoparticle diameter is greater than one-half the pore size, then the pore will be closed to further nanoparticle transport. On the other hand, the nanoparticle size (or size of a nanoparticle cluster) to be large enough such that the diameters are at least as big as the hydrogen binding periodicity on the ANF polymer (see, e.g., the above-referenced hydrogen bonding sites shown in FIG. 1). If the nanoparticles are smaller than that periodicity, then dot-to-dot charge transfer may be compromised because the nanoparticles are not sufficiently close to one another. In some cases, each nanoparticle 106 has a size at most one-half the pore size presented by the matrix of nanofibers 104. For example, the size of each nanoparticle 106 may fall in a range from about three nanometers (nm) to about 20 nm, while the pore size of the corresponding nanofiber matrix may fall in a range from about six nm to about 40 nm, although other sizes and dimensions may be used.

The conductor 100 further includes a plurality of organic capping ligands 108. The pH and temperature control implemented during the nanoparticle growth process allows at least some of the ligands 108 to remain present, and ultimately bonded to the polymer. If annealing is implemented, any vaporization may involve a subset of the ligands disposed between adjacent nanoparticles and, thus, not bonded to the polymer. Such vaporization may decrease the copper-to-copper distance between adjacent nanoparticles. The spacing may thus close, which may increase conductivity. In contrast, the annealing may not vaporize or otherwise affect the ligands bonded to the polymer. The annealing may treat the ANF-bonded ligands differently than those ligands only surrounding the nanoparticle. In this way, each organic capping ligand 108 may bond a respective nanoparticle 106 of the distribution of nanoparticles to a respective aramid nanofiber 104 of the matrix. For instance, the organic capping ligands 108 establish hydrogen bonds with the matrix of aramid nanofibers 104.

In the example of FIG. 1, each of the organic capping ligands is composed of, or otherwise includes, one or more mercaptocarboxylic acids. In some cases, the mercaptocarboxylic acid(s) include mercaptosuccinic acid (MSA). Additional or alternative mercaptocarboxylic acids may also or alternatively be used. Still further or alternative organic capping ligands may be used, including, for instance, carboxylic acids, such as glycolic and citric acid, and/or organosilane capping ligands having a hydroxyl group, carboxyl group, an amine group, and/or a thiol group. The length of these and other short-chained ligands may facilitate conductivity. To functionalize the aramid nanofiber matrix with the copper nanoparticles 106, the ligand may exhibit strong bonding affinity with the aramid nanofiber matrix. The ligand may also be a short-chained coordinating ligand to accomplish nanoparticle-to-nanoparticle electrical coupling without chemical ligand removal and exchange and recipes. The ligand may also exhibit colloidal stability so that the nanoparticles in the solution are capable of being bonded before flocculation or aggregation occurs during incorporation. Ligands such as MSA may also limit the nanoparticle-to-nanoparticle bonding affinity during incorporation in the fiber matrix. Other ligands that provide the above-referenced functionality may be used.

In some cases, the conductor 100 includes one or more components in addition to the above-described elements. For example, the conductor 100 may further include an insulator surrounding the nanocomposite structure or framework 102. The insulator may be composed of, or formed from, further aramid nanofibers and/or another material or structure. The insulator may or may not include further nanoparticles bonded to the further aramid nanofibers.

The arrangement of the nanofibers 104 may vary. In some cases, the arrangement of the nanofibers 104 is irregular as shown. In other cases, the nanofibers 104 are arranged in a regular or semi-regular pattern via, e.g., electrophoresis and/or other techniques to line up or otherwise arrange the nanofibers 104.

The nanofibers 104 and the nanoparticles 106 are not shown to scale in the schematic depiction of FIG. 1. The shapes of the nanofiber 104 and the nanoparticles 106 may also vary from the example shown. In the chemical depiction of FIG. 1, dotted lines indicate possible hydrogen bonding sites or opportunities. Further details regarding the nanoparticles 106 and the nanofibers 104 are provided below.

The incorporation of the nanoparticles 106 into the nanocomposite structure or framework 102 leads to high conductivity and flexibility due to the controlled assembly of conductive pathways along the fiber backbones. Infiltration of ANF hydrogel films with the copper nanoparticles 106 forms a flexible composite material capable of achieving high levels of conductivity. Through controlled hydrogen-bonding between the organic capping ligands 108 and the scaffolding provided by the para-aramid polymer of the framework 102, the nanoparticles 106 self-assemble into an interconnected network capable of efficiently transporting charge carries through the assembled pathways, while relying on the robust mechanical strength and flexibility imparted by the Kevlar-derived fibers 104.

The aramid nanofiber matrix confers strength and flexibility to the nanocomposite structure or framework 102. The amide groups along the polymer of the framework 102 provide a regularized template upon which the ligands 108 for the nanoparticles 106 may hydrogen bond and thereby facilitate close-packed self-assembly. If the nanoparticle-to-ANF bonding is weak or the nanoparticle size is not compatible with the bond spacing, then either poor or disordered nanoparticle loading may result.

The aramid nanofibers (ANFs) may be derived from well-known ultrastrong Kevlar™ macrofibers. The aramid nanofibers retain the high strength, toughness, and temperature resilience characteristic of aramid macrofibers, while eliminating the hygroscopic sensitivity of Kevlar fibers. The aramid nanofibers are flexible (e.g., capable of bending at least 1000 times without mechanical or electrical degradation), and strong (e.g., about 2-10 GPa). The resulting conductor 100 is lightweight (e.g., approximately 1/10th of the mass density at present). The aramid nanofiber matrix may be porous (e.g., about 47% porosity).

As described herein, the conductor 100 is not limited to cylindrical shapes, rounded, or other form factors. The conductor 100 may be formed from films or other planar structures. These and other shaped conductors may be fabricated using the blade-coating, wire-casting, and other techniques described herein. The lightweight, flexible, high-strength conductor may be deposited or otherwise processed in other ways to achieve a desired form factor. The resulting conductors 100 may have about 1/10th the mass of solid copper, and with slightly higher strength than a standard cylindrical copper conductor of similar size. The slightly higher strength may be useful in a variety of ways, including, for instance, design choices. For instance, the cross-section of the Cu-ANF composite conductor 100 may be reduced relative to the standard copper conductor so that the strength is equivalent, but while achieving a much lower mass.

The conductivity of the conductor 100 is increased dramatically via the incorporation of the copper nanoparticles 108. The conductors 100 have exhibited conductivity levels 11 orders of magnitude higher than the ANF matrix alone. One can configure the framework 102 into either a solid conductor, or use the difference in conductivity to fabricate a self-insulating conductor. In the latter case, the high conductivity of, for instance, a heavily copper-loaded side of the framework 102 (e.g., R=1.7 Ohms) is bounded by a highly insulating pure-ANF layer (e.g., R>100 MOhms). Thus, by controlling the infiltration of the copper nanoparticles 108 through the ANF matrix, the conductor 100 may be configured as a self-insulating conductor due to the difference in conductivity between different regions of the framework 102 (e.g., the interior and exterior of the framework 102).

The conductor 100 is also temperature-resilient (e.g., up to 300° C.). Such temperature resilience may be useful in a wide variety of applications. In one example, the conductor 100 may be useful in battery applications as a replacement for the pure copper conductor currently used in the battery stack.

The Kevlar-based strength of the conductor 100 also makes the conductor 100 useful as a high-reliability interconnect and a potential pathway to reduce the interconnect-induced bottleneck at the die-PCB interface because smaller bump bonds may be formed with the conductor 100.

Figure 2:
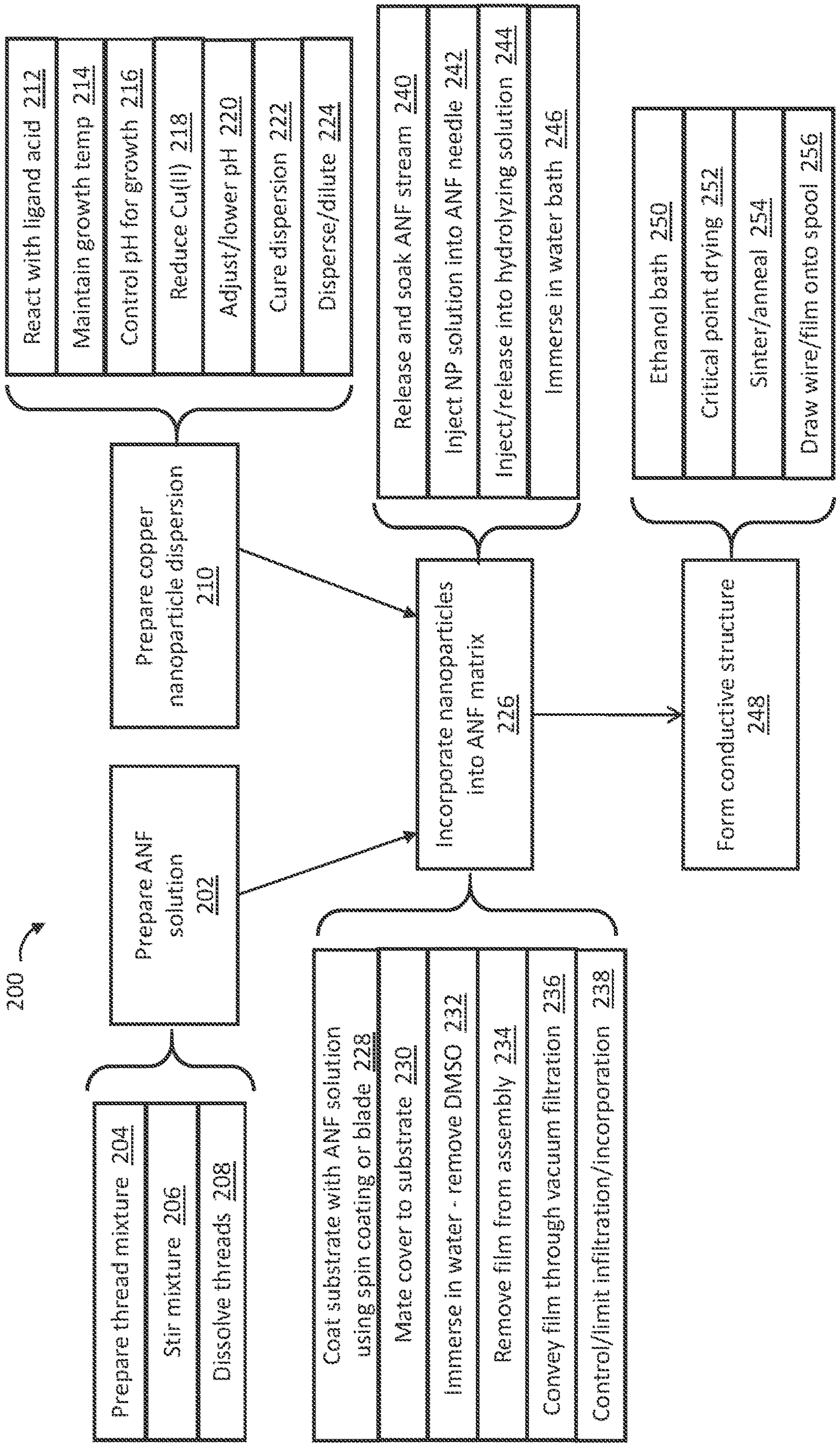
FIG. 2 is a flow diagram of a method of fabricating a conductor in which copper nanoparticles are incorporated into a matrix of aramid nanofibers in accordance with several examples.

FIG. 2 depicts a method 200 of fabricating a conductor in accordance with several examples. The method 200 may be used to manufacture one of the conductors described herein or another conductor. The method 200 may include additional, fewer, or alterative acts. For instance, the method 200 may or may not include one or more acts directed to post-processing of the fabricated conductor, such as drawing the conductor onto a spool (act 256). The order of the acts of the method 200 may vary from the examples shown in FIG. 2. For instance, acts directed to the preparation of solution(s) and dispersion(s) may be conducted concurrently or in any order.

The method 200 includes an act 202 in which an aramid nanofiber solution is prepared. The solution is prepared such that a matrix of aramid nanofibers is dispersed in the aramid nanofiber solution. The act 202 may include one or more procedures described in the above-referenced publications. In the example of FIG. 2, the act 202 includes an act 204 in which a Kevlar thread-based mixture is prepared. For instance, a Kevlar-based mixture may include Kevlar thread, KOH, and dimethyl sulfoxide (DMSO). In one example, 8.0 g of Kevlar thread and 8.0 g of KOH were added to 400 mL of DMSO, but other amounts may be used. The resulting polar, DMSO-based solvent mixture uses partial hydrolysis with KOH. The removal of some of the hydrogen atoms makes the aramid nanofibers charged and convenient for coupling to various NPs. The diameter of the ANFs may be controlled by changing the water-DMSO ratio. Nanofibers from 4-25 nm in diameter may thus be produced, through which the transparency of the sample can be controlled.

The mixture may then be stirred in an act 206. The mixture may be stirred until the Kevlar is completely dissolved in accordance with an act 208. In some cases, the mixture is magnetically stirred at room temperature for over a week until the Kevlar thread is completely dissolved, forming a dark red viscous solution. The resulting ANF solution (e.g., 2 w/v % ANF dispersion) may be shaped into films or wire-shaped structures as described below. The shape, size, thickness, etc. of the structures may be determined by a speed of the coating process. The structures are eventually immersed in water (e.g., deionized water) until all DMSO is removed, resulting in a yellowish-colored ANF hydrogel.

The preparation of the ANF solution may be configured to optimize, or otherwise achieve, a desired ANF porosity. One part of the material optimization is the porosity of the nanofiber matrix as well as the size of the fibers, both of which may be controlled via the water-DMSO ratio. During the dissolution of the nanofiber and its subsequent formation into a hydrogel, the diameter of the nanofiber and the pore size may be controlled through the water-DMSO ratio. The dissolved Kevlar forms a solution in DMSO. The interface that interacts with the water results in a higher density of fibers than that which is away from the direct water-DMSO interface. The surface with the most interaction with water has a high-density of fibers. If that side serves as the front-side during nanoparticle incorporation (e.g., vacuum filtration), then the pores may fill with the nanoparticles.

In an act 210, a dispersion of copper nanoparticles is prepared. The act 210 may be implemented such that a plurality of nanoparticles are synthesized in a solution. The solution may include dissolved copper sulfate in some cases. Other copper salt or precursors may be used, including, for instance, copper nitrate or copper acetate.

The synthesis of each nanoparticle is facilitated with one or more organic capping ligands. The act 210 may include an act 212 in which a copper-based solution is reacted with a ligand acid. As a result, each copper nanoparticle of the dispersion of cooper nanoparticles has an organic capping ligand attached to the copper nanoparticle. In some cases, the organic capping ligand is composed of, or otherwise includes, mercaptosuccinic acid (MSA) or other mercapto-carboxylic acids. Additional or alternative ligands may be used as described herein. The ligand may be configured for bonding to the copper nanoparticles (e.g., via a thiol group) and for bonding to the ANF (e.g., via a carboxyl group). In this way, a single ligand (e.g., the same ligand) may be used for both for copper nanoparticle growth and for binding to the ANF. The foregoing notwithstanding, multiple types of ligands (e.g., a dual ligand system) may be used in other cases. In cases using MSA as the ligand, a strong enhancement of nanoparticle-ANF binding may be achieved relative to other ligand options, such as thioglycholic acid (TGA) and 1-thioglycerol (TGOL). In one example of the nanoparticle synthesis of the act 210, 0.04 g of copper sulfate and 0.08 g of mercaptosuccinic acid were dissolved into 45 mL of deionized water, but other amounts may be used.

Alternative or additional ligands may be used to synthesize the copper nanoparticles (e.g., coordinating the copper nanoparticles), as described above. For example, citric acid may be used. But the ligands may differ in the extent to which the ligands bond to ANF. Thus, in some cases, one or more ligands may be used for nanoparticle coordination and other synthesis (e.g., in the act 210), and one or more other ligands, such as MSA, may be used for facilitating the bonding and other incorporation of the nanoparticles into the ANF matrix.

In an act 214, the solution is heated to maintain a temperature for growth of the copper nanoparticles. In one example, the solution is heated to, and maintained at, about 50° C. under strong magnetic stirring for 30 min, but the growth temperature and/or stirring time period may vary.

The act 210 may include an act 216 in which the pH of the solution is controlled or established for the dispersion during nanoparticle growth. The pH level (e.g., a lower pH) may be controlled to facilitate hydrogen bonding while preventing nanoparticle aggregation, as described below. The pH level may fall in a range associated with slightly alkaline pH values (e.g., a pH between about 7 and about 8), but other pH levels may be used. The pH of the solution may be controlled or established by adding sodium hydroxide (NaOH) solution. The addition of the NaOH solution may provide pH control. In one example, about 0.6 mL of 10 M NaOH solution is added, but the amount and other characteristics of the pH control solution may vary. Additional or alternative alkaline solutions, either with or without alternative ligands, may be used in other cases. The pH control may be implemented after the stirring of the act 214, or at another time. In some cases, the act 216 is implemented during further stirring. For example, the NaOH solution may be added under strong stirring for about 30 minutes, although the additional stirring time period may vary. Stable, colloidal solutions may be produced at pH levels between about 5 and about 11. In one example, the Cu nanoparticles were capped with MSA as the capping ligand at a pH level of about 9.

The pH control may be directed to establishing that the solution is slightly alkaline. If the solution is alkaline, then the nanoparticles become more negatively charged, and hence more repulsive. As a result, the nanoparticles therefore bond preferentially with the ANF rather than with each other. This desired result is achieved with MSA as the capping ligand under highly basic conditions. If the pH is not well-controlled, then the copper nanoparticles bond with each other before bonding with the ANF matrix, insofar as the nanoparticles form a lattice array that collects on the top-most surface during vacuum filtration. The nanoparticles thus fail to penetrate through the ANF matrix. If the MSA is deprotonated (e.g., make repulsive due to OH— groups) to prevent aggregation and lattice formation, then the Cu nanoparticles may be fully incorporated throughout the thickness of the ANF matrix.

Very acidic pH values (e.g., pH<4) may instead result in nanoparticle-to-nanoparticle aggregation (e.g., spherical close-packed clusters), an undesirable condition. At too high of pH level, the nanoparticles may interconnect too effectively in long-range nanowires. In neither case do the nanoparticles penetrate and effectively bond with the ANF matrix. If the nanoparticles coalesce into extended structures prior to passing through the ANF, then the structures will clog on the top of the ANF matrix and simply coat the ANF matrix. The Cu nanoparticles may thus aggregate at the surface of the ANF matrix, rather than be incorporated throughout and within the ANF matrix.

In some cases, the pH may be controlled to achieve a desired level of incorporation. The difference between the conductivity of the Cu-ANF composite structures described herein and that of the bare ANF is 11 orders of magnitude. Thus, the lack of incorporation may be used to create an insulating layer. The insulating layer may be adjacent to a conducting layer in which the Cu nanoparticles are incorporated. For instance, a stack of layers of copper-filled and copper-voided ANF may be formed to provide a wiring configuration with both insulation and conductivity.

The act 210 may include an act 218 in which hydrazine is added as a reducing agent to the copper salt-based solution to reduce Cu(II). In one example, about 6.25 mL of hydrazine hydrate is added into the mixture under strong stirring for an additional 30 minutes, but the amount and stirring time period may vary. Alternative or additional reducing agents may be used, including, for instance, diethylene glycol or sodium hydroxide.

In the example of FIG. 2, the act 210 further includes an act 220 in which the pH of the solution, or dispersion, is adjusted. This pH adjustment may be implemented after the nanoparticle growth. The pH level is adjusted from the above-described pH at which the solution is maintained for nanoparticle growth, to a lower pH in preparation for incorporating the copper nanoparticles into the matrix of aramid nanofibers. The lower pH may be a near-neutral pH. The lower pH level may facilitate both colloidal stability and bonding with the aramid nanofibers. The lower pH level may fall in a range from about 7 to about 8. The pH adjustment may be implemented via addition of HCl and/or another acid. In one example, 6.0 mL of 10 M HCl was added to adjust the solution pH to be in the 7-8 range (e.g., a pH of about 7.70), but the amount and other characteristics of the acid may vary.

In some cases, the colloidal solution resulting from the above-described acts directed to nanoparticle growth may be cured in an act 224. Curing the nanoparticle dispersion may include refrigeration. For instance, the nanoparticle dispersion may be refrigerated at about 4° C. for at least one day, although the temperature and curing time period may vary. In one example, after about 2 days of curing, the nanoparticle solution changed from a translucent, Cu-colored solution to a darker brown solution resembling muddy water. The resulting solution produced conductive films with much greater conductivity. Allowing the Cu nanoparticles to grow or"cure" may result in lower conductivity because the nanoparticles couple more effectively to each other when incorporated within the ANF matrix.

The act 210 may also include an act 224 in which the above-described Cu-MSA nanoparticle solution or dispersion is diluted before incorporation into the ANF matrix. The solution may be diluted by at least 10 times. Alternatively or additionally, the solution may be cleaned via dialysis and/or subsequently centrifuged (e.g., at about 5000 rpm for about 30 minutes), after which the solution may be dispersed with water (e.g., deionized water) under ultrasonic treatment.

The method 200 includes an act 226 in which the copper nanoparticles of the dispersion are incorporated into the ANF matrix. Each incorporated copper nanoparticle is bonded to a respective aramid nanofiber of the ANF matrix via the organic capping ligand to which the copper nanoparticle is attached.

The manner in which the nanoparticles are incorporated may vary in accordance with the configuration and/or other characteristics of the conductor (or conductive structure) being formed, and/or the manner in which the conductor is formed. For instance, if a conductive film is being formed (with or without dicing or other processing), then one or more acts 228-238 may be implemented. Alternatively, if a conductive wire is being formed, one or more acts 240-246 may be implemented. Other combinations of the acts 228-246 may implemented in other cases.

To form a conductive film, the act 226 may include an act 228 in which a substrate is coated with the ANF solution. The substrate may be or include a glass, plastic, or other substrate. The coating may be implemented with a blade or other apparatus. The blade-based coating technique may allow a continuous substrate, e.g., a web, to be coated, as described below in connection with the example apparatus of FIG. 4. A cover, such as a plastic cover, may be mated to the substrate in an act 230 in preparation for ANF hydrogel formation. The coating may be implemented in additional or alternative ways, including, for instance, a spin coating process.

In an act 232, an ANF hydrogel is formed by immersing the films and the substrate into water (e.g., deionized water). The immersion removes the DMSO. The immersion may also concurrently separate the ANF hydrogel from the substrate. In other cases, the ANF film may be removed from the substrate in an act 234. In the example of FIG. 2, the copper nanoparticles are incorporated into the ANF matrix once the ANF hydrogel is free of, e.g., removed from, the substrate. In other cases, the copper nanoparticles may be incorporated into the ANF matrix while the ANF hydrogel remains supported by the substrate and/or another support structure.

The ANF film may be conveyed through a vacuum filtration apparatus in an act 236 to infiltrate or incorporate the nanoparticles into the ANF matrix. In that case, the ANF film may be disposed as, or take the place of, a filtration membrane. Alternative or additional incorporation techniques may be used, including, for instance, a soaking or other exposure of the ANF film to the nanoparticles. In some cases, the filtration or other incorporation procedure may be limited or otherwise controlled to achieve a desired amount (e.g., depth) of infiltration.

In cases in which the conductive structure is or includes a conductive wire, the nanoparticles may be incorporated into the ANF matrix in an act 240, in which a stream of the ANF hydrogel is released and soaked in the nanoparticle (e.g., Cu-MSA) solution or dispersion. The ANF stream may be provided through an orifice, via a needle, and/or using other apparatus.

A wire-shaped conductor may be formed in other ways. For instance, in an act 242, the nanoparticle solution or dispersion may be injected into a needle or other apparatus through which the ANF solution is provided. The resulting composite stream may then be injected by the needle or other apparatus into a hydrolyzing solution in an act 244. Further details regarding an injection-based approach are provided in connection with the example of FIG. 6.

The wire-shaped, composite structure resulting from the incorporation procedure may be immersed in a water bath in an act 246.

The method 200 may include an act 248 in which the composite structure is collected and/or otherwise formed into a conductive structure. The formation of the conductive structure may include one or more acts, including, for instance, an ethanol bath in an act 250, followed by a drying act 252, sintering and/or annealing in an act 254, and drawing the film, wire, or other structure onto a spool in an act 256. The ethanol bath may use, e.g., 200-proof ethanol, and continue for 24 hours at room temperature.

The drying act 252 may use a drying frame or other apparatus. To avoid undesirable shrinking of the composite structure during drying, critical-point drying may be implemented, rather than drying the samples in air. The critical-point drying may preserve the porosity and morphology of the ANF film. The films, wires, or other conductive structures may be placed in a critical-point dryer, such as a sealed hyperbaric vessel into which supercritical carbon dioxide is provided. The structures may be maintained under supercritical $CO_2$ for a period of time, e.g., 10 minutes. The critical-point drying may avoid stiffening and shrinking that otherwise leads to mechanical stress, fractures, and reduced conductance of the composite. The microscopic morphologies of the Cu nanoparticle-ANF composite structures also improve significantly under critical-point drying.

In the act 254, an annealing procedure may be implemented. The annealing procedure may be used to improve conductivity. The annealing addresses the capping ligands that would otherwise restrict charge flow. As described above, some of the ligands may be removed to a certain extent via vaporization, thereby leading to fusing of adjacent nanoparticles to one another. In one example, upon annealing at 200 degrees Celsius, the resistivity improved to 10.8 micro-W cm, compared to 1.7 micro-W cm for bulk copper.

In some cases, the temperature ramp rate of the annealing procedure is controlled. A controlled ramp rate may increase the ampacity of the Cu nanoparticle-ANF composite structures, as well as increase robustness after reaching a current-carrying peak. The annealing may also be controlled to avoid decreases in conductivity, which may be caused by surface oxidation of Cu NPs and/or cracking of the composite structure.

In some cases, the conductive structures may be formed using oven drying alone. In such cases, critical-point drying and/or subsequent compression steps may not be warranted. In other cases, critical-point drying and/or subsequent compression may be used, e.g., to improve conductivity.

The above-described method may be configured to fabricate a conductor with a desired level of conductivity. For instance, the nanoparticle synthesis acts may be configured such that the resulting nanoparticles are small enough (e.g., less than 20 nm) to be capable of traversing through the porous the ANF matrix without clogging the holes. The ANF-related acts may be configured such that the ANF pores are, in turn, large enough (e.g., greater than 40 nm) such that the nanoparticles may pass through relatively unmolested.

In examples using MSA as the capping ligand, a narrow band of neutral pH values (e.g., about 7.5 to about 8.0) may be used for nanoparticle incorporation into the ANF matrix. The resulting solution is stable, and the Cu nanoparticles are capable of bonding with the ANF prior to bonding with each other. Furthermore, the resulting flexible, high-strength solid with heavily loaded Cu nanoparticles (50.7%) is conductive throughout the structure. For instance, resistances of 1.7 Ohms, 27 Ohms, and 39 Ohms were achieved at the top, bottom, and middle of one example conductor, all prior to heat treatment, thereby demonstrating effective bonding and interconnections of the nanoparticles.

Figure 3:
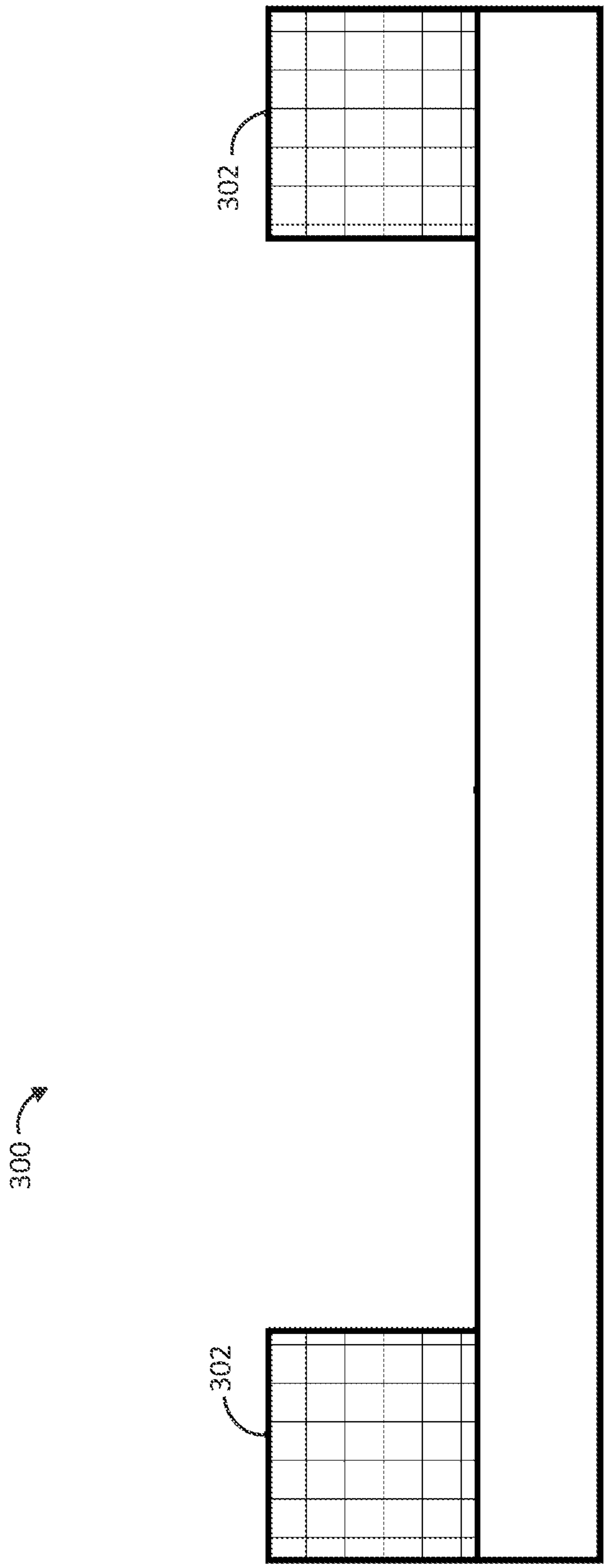
FIG. 3 is a side, schematic view of a substrate assembly for use in a method of fabricating a conductive film in which copper nanoparticles are incorporated into a matrix of aramid nanofibers in accordance with one example.
Figure 4:
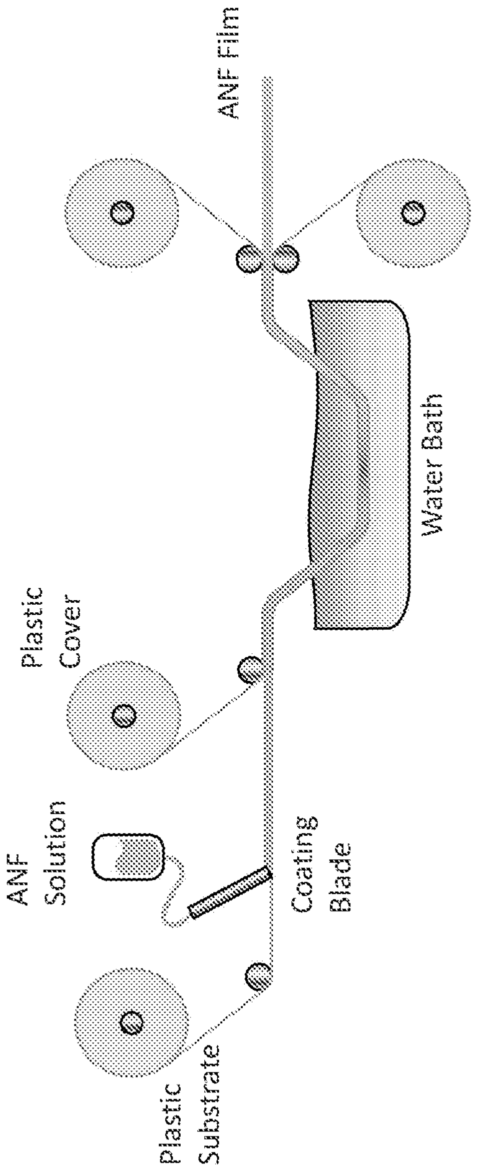
FIG. 4 is a side, schematic view of a fabrication process in which an aramid nanofiber film is prepared for use in a method of fabricating a conductive film in accordance with one example.
Figure 5:
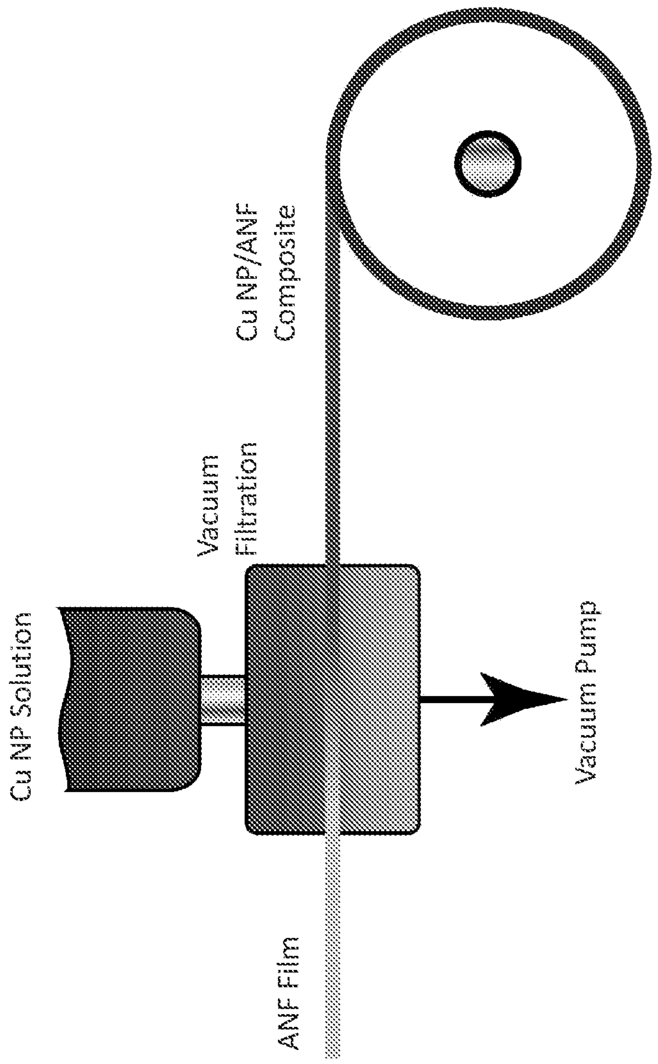
FIG. 5 is a side, schematic view of the incorporation of copper nanoparticles into an aramid nanofiber film in accordance with one example.

FIGS. 3-5 depict examples of a fabrication process by which a conductive film is formed in a continuous, "roll-to-roll" manner. One technique for fabricating the composite structures at scale involves blade-coating of the ANF solution. In the blade-coating method. ANF solution is blade-coated onto a substrate 300 (FIG. 3). The substrate 300 may have spacers 302 (FIG. 3), such as Kapton spacers, or other containment structures along lateral edges thereof. A thin line of ANF solution may be pipetted or otherwise provided, e.g., near a top or other end of the substrate 300. After the ANF solution line is deposited on the substrate 300, a glass or other slide or other blade is pulled across the substrate, from top to bottom, to distribute the viscous ANF solution uniformly across the trench defined by the spacers of the substrate. After the layer is deposited, the substrate was placed in water to hydrolyze the ANF, producing a clear film of nanoporous ANF.

FIG. 4 shows the blade-coating approach in an example of a scaled-up system. In this example, the blade is stationary while the substrate-based assembly is conveyed under the blade. The substrate may be composed of, or otherwise include, a flexible plastic material. The spacers may be configured with micropores to allow water infiltration into the ANF solution, curing it to the ANF film.

The blade may include two surfaces with a spacer through which ANF solution is pumped or otherwise provided onto the substrate. The surface facing away from the direction of the substrate conveyance may be angled to ensure a uniform coating of the ANF solution.

As shown in FIG. 4, after coating, a covering surface (e.g., a plastic film or sheet) may be mated to the substrate. The resulting assembly may then be dipped into a tank of water, with a web speed adjusted to ensure that the ANF is sufficiently immersed in the water bath (e.g., for at least several minutes). The ANF may then be removed from the encasing plastic covering, spacer, and substrate, and further processed to incorporate the copper nanoparticles.

The infusion or other incorporation process of Cu nanoparticles into the resulting long ANF sheets may involve a batch process to address the pressure differentials involved for ANF filtration. For example, as shown in FIG. 5, a controlled vacuum conveyor filtration system may be used. The system may provide for high-volume, roll-to-roll fabrication of a conductive film in which the copper nanoparticle solution is infused into the still-hydrolyzed ANF film. The system may operate step-by-step or continuously, depending on the vacuum filtration apparatus design.

Figure 6:
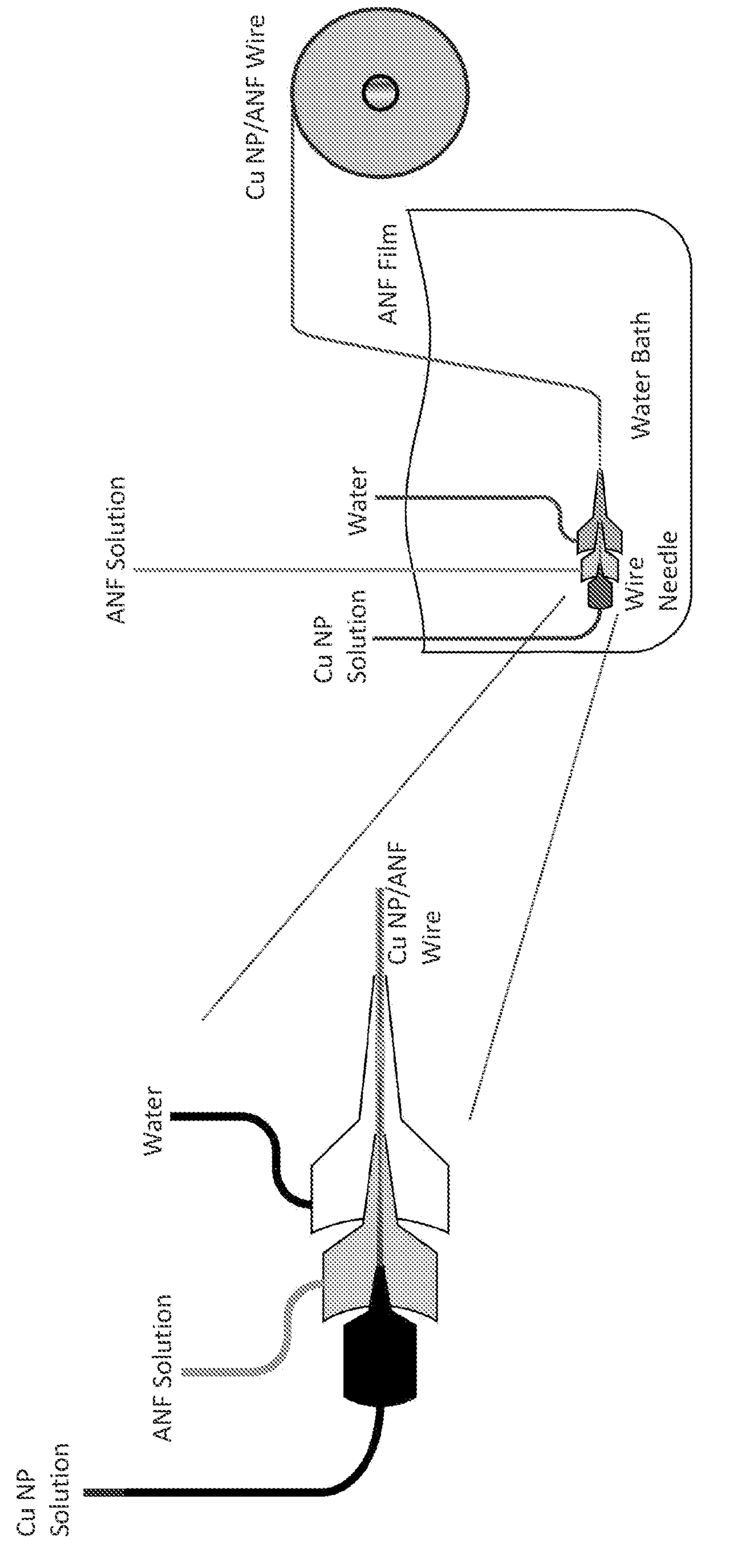
FIG. 6 is a side, schematic view of a method of fabricating a wire-shaped conductor in which copper nanoparticles are incorporated via injection into a stream of an aramid nanofiber solution in accordance with one example.

FIG. 6 depicts an example of a process by which the fabrication of wire-shaped conductors may be scaled up. The wire-shaped conductors may be based on cylindrical ANF structures. The process includes a wire-forming needle (shown in detail) incorporated into a manufacturing system. The wire-forming needle contains separate lines of pressurized Cu nanoparticle solution, ANF solution, and water (or additional Cu nanoparticle solution). The wire-forming needle is configured such that Cu nanoparticle solution is injected inside the ANF solution, with the ANF forming a "jacket" around the initial Cu nanoparticle solution. The resulting wire may then be drawn out in a water or dilute Cu NP solution bath, from which the wire is removed, cured, and spooled.

The example of FIG. 6 involves the injection of Cu nanoparticle solution under pressure into a larger needle pumping ANF solution. This in turn may be injected into an even larger needle containing either water, as shown in the schematic, or diluted Cu nanoparticle solution, to aid in hydrolyzation of the ANF matrix. Curing of the ANF matrix causes the nanofibers to shrink and bond to each other. This in and of itself induces inward pressure on the inner cavity of the ANF "jacket", which may aid in the filtration of the Cu nanoparticles and their incorporation into the nanoporous ANF matrix. Additional immersion of composite wires in a Cu nanoparticle solution will enable the incorporation of additional Cu nanoparticles into the cylindrical composite, further improving its conductivity.

In this system, the pressure of each liquid line, as well as the draw rate of the wire both in the water/Cu nanoparticle solution bath and in the air may be optimized or otherwise controlled to produce high-conductivity, uniform Cu nanoparticle-ANF composite wiring.

In some cases, the injection-based approach of FIG. 6 may be used to form self-insulated conductive structures. Because the nanoparticle solution is injected internally, the distribution of copper nanoparticles is spatially non-uniform in the matrix of aramid nanofibers across a cross-section of the framework. As a result, an exterior of the ANF framework is insulating, and an interior of the framework is conductive.

Figure 7:
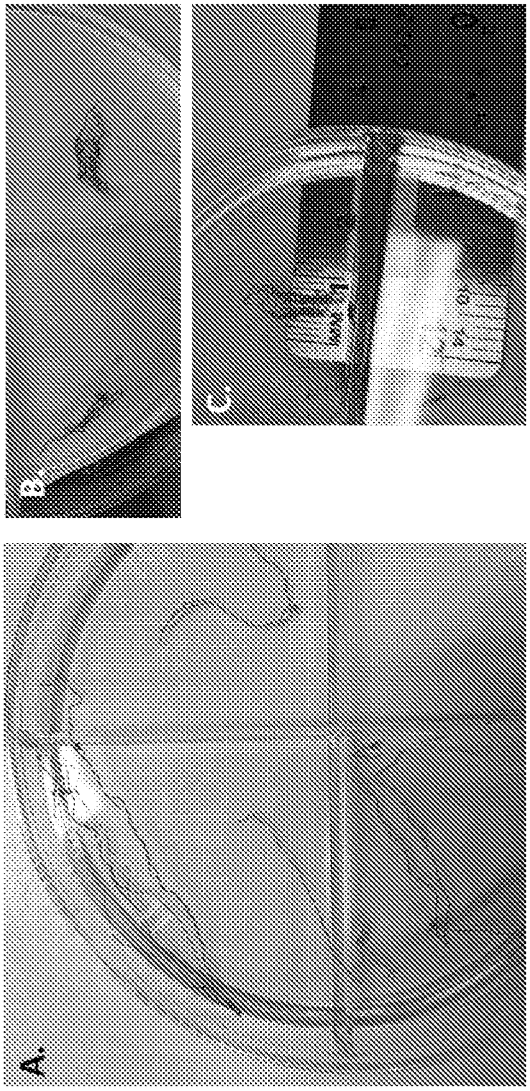
FIG. 7 depicts images of cylindrical Cu NP-ANF composite wires prepared via an injection-based method of fabrication in accordance with one example.
Figure 8:
FIG. 8 depicts images of ANF wires formed by pushing an ANF solution through an orifice into water, and the ANF wires after soaking in a copper-MSA colloidal solution, in accordance with one example of the disclosed fabrication methods.

Alternatively or additionally, cylindrical ANF nanofiber matrices may be otherwise formed by pumping the ANF solution through a syringe or other needle immersed in water. The output of the needle may be placed into water and the "wire" released into solution as the ANF is expelled through the needle orifice. The copper nanoparticles may be incorporated into the ANF nanofiber matrix if the syringe is immersed in a diluted Cu NP solution. Wires longer than 4 cm have been prepared using these methods, examples of which are shown in FIGS. 7 and 8. The wires have a diameter falling in a range of about 200 μm to about 300 μm, which corresponds to wiring of AWG gauge of 29 to 32.

The wire-shaped conductors may be formed without the use of a needle. In other cases, a die mechanism may be used.

FIG. 9 depicts side-angle SEM micrographs of air-dried Cu NP/ANF composite films (A-C), showing a platelet-like structure for the ANF nanofiber matrix consistent with shrinking, the effect of which can be the propagation of micro-fractures as seen in (C). Top-view SEM micrographs of critical-point dried ANF films (D-F), which maintain their highly porous nanofiber matrix. The microscopic morphologies of Cu NP/ANF composites may be improved under critical-point drying. The nanofiber matrix is clearly seen in the SEM micrographs of FIG. 9.

FIG. 10 depicts a method 1000 of fabricating a detector that includes an electrode or other conductive layer or component formed in accordance with one example. The detector may be directed to detecting particles and/or photons. The method 1000 includes preparing an aramid nanofiber solution in which a matrix of aramid nanofibers are dispersed (act 202), preparing a dispersion of semiconductor nanoparticles (act 204), preparing a dispersion of copper nanoparticles (act 206), e.g., as described above, incorporating copper nanoparticles of the dispersion of copper nanoparticles into the matrix of aramid nanofibers to form a conductive layer (act 208), and incorporating semiconductor nanoparticles of the dispersion of semiconductor nanoparticles into the matrix of aramid nanofibers to form a detector layer adjacent to the conductive layer (act 210).

FIG. 11 depicts a detector 1100 in accordance with one example. The detector 1100 may be formed via the method of FIG. 10. The detector 1100 includes a substrate 1102 that, in turn, includes a matrix of aramid nanofibers, a distribution of copper nanoparticles bonded to the matrix of aramid nanofibers to define a conductive layer 1104 of the substrate 1102, and a distribution of semiconductor nanoparticles bonded to the matrix of aramid nanofibers to define a detector layer 1106 of the substrate 1102. The conductive layer 1104 is disposed adjacent to the detector layer 1106 to capture charges generated by photons or particles 1108 incident upon the detector layer 1106. As shown in FIG. 11, the conductive layer 1104 may be pixelated.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method of fabricating a conductor, the method comprising:

preparing an aramid nanofiber solution in which a matrix of aramid nanofibers is dispersed;

preparing a dispersion of copper nanoparticles, each copper nanoparticle of the dispersion of cooper nanoparticles having an organic capping ligand attached to the copper nanoparticle; and incorporating copper nanoparticles of the dispersion of copper nanoparticles into the matrix of aramid nanofibers such that each incorporated copper nanoparticle is bonded to a respective aramid nanofiber of the matrix of aramid nanofibers via the organic capping ligand to which the copper nanoparticle is attached;

wherein the organic capping ligand comprises a mercaptocarboxylic acid.

2. The method of claim 1, wherein the mercaptocarboxylic acid comprises mercaptosuccinic acid.

3. The method of claim 1, wherein preparing the dispersion of copper nanoparticles comprises lowering a pH of the dispersion in preparation for incorporating the plurality of copper nanoparticles into the matrix of aramid nanofibers.

4. The method of claim 3, wherein the pH is lowered to between about 7 and about 8.

5. The method of claim 1, further comprising:

coating a substrate with the aramid fiber solution using a spin coating process; and implementing a vacuum filtration procedure in which the film is disposed as a filtration membrane.

6. The method of claim 1, further comprising:

coating a substrate with the aramid fiber solution using a blade to form a film; and implementing a vacuum filtration procedure in which the film is disposed as a filtration membrane.

7. The method of claim 6, further comprising forming a conductive structure from the film after incorporating the copper nanoparticles, wherein forming the conductive structure comprises drawing the film onto a spool.

8. The method of claim 1, wherein incorporating the copper nanoparticles comprises:

releasing the aramid fiber solution as a stream in a hydrolyzing solution to form a wire; and soaking the wire in the dispersion of copper nanoparticles.

9. The method of claim 1, wherein incorporating the copper nanoparticles comprises:

injecting the dispersion of copper nanoparticles into a stream of the aramid nanofiber solution provided by a first needle such that a composite stream is defined by the first needle; and injecting the composite stream into a stream of a hydrolyzing solution to define a thread in the hydrolyzing solution.

10. The method of claim 9, further comprising forming a conductive wire from the defined thread after incorporating the copper nanoparticles, wherein forming the conductive wire comprises drawing the conductive wire onto a spool.

11. The method of claim 1, wherein preparing the dispersion of copper nanoparticles comprises curing the dispersion of copper nanoparticles after the nanoparticle growth.

12. The method of claim 1, wherein preparing the dispersion of copper nanoparticles comprises lowering a pH of the dispersion after growth of the copper nanoparticles.

13. A method of fabricating a conductor, the method comprising:

preparing an aramid nanofiber solution in which a matrix of aramid nanofibers is dispersed;

preparing a dispersion of copper nanoparticles, each copper nanoparticle of the dispersion of cooper nanoparticles having an organic capping ligand attached to the copper nanoparticle; and incorporating copper nanoparticles of the dispersion of copper nanoparticles into the matrix of aramid nanofibers such that each incorporated copper nanoparticle is bonded to a respective aramid nanofiber of the matrix of aramid nanofibers via the organic capping ligand to which the copper nanoparticle is attached;

wherein preparing the dispersion of copper nanoparticles comprises:

establishing a first pH for the dispersion during nanoparticle growth; and adjusting the dispersion from the first pH to a second pH after the nanoparticle growth in preparation for incorporating the plurality of copper nanoparticles into the matrix of aramid nanofibers, the second pH being lower than the first pH.

14. The method of claim 13, further comprising:

coating a substrate with the aramid fiber solution using a blade to form a film; and implementing a vacuum filtration procedure in which the film is disposed as a filtration membrane.

15. The method of claim 14, further comprising forming a conductive structure from the film after incorporating the copper nanoparticles, wherein forming the conductive structure comprises drawing the film onto a spool.

16. The method of claim 13, further comprising:

coating a substrate with the aramid fiber solution using a spin coating process; and implementing a vacuum filtration procedure in which the film is disposed as a filtration membrane.

17. The method of claim 13, wherein incorporating the copper nanoparticles comprises:

releasing the aramid fiber solution as a stream in a hydrolyzing solution to form a wire; and soaking the wire in the dispersion of copper nanoparticles.

18. The method of claim 13, wherein incorporating the copper nanoparticles comprises:

injecting the dispersion of copper nanoparticles into a stream of the aramid nanofiber solution provided by a first needle such that a composite stream is defined by the first needle; and injecting the composite stream into a stream of a hydrolyzing solution to define a thread in the hydrolyzing solution.

19. The method of claim 18, further comprising forming a conductive wire from the defined thread after incorporating the copper nanoparticles, wherein forming the conductive wire comprises drawing the conductive wire onto a spool.

20. The method of claim 13, wherein preparing the dispersion of copper nanoparticles comprises curing the dispersion of copper nanoparticles after the nanoparticle growth.

21. The method of claim 20, wherein curing the dispersion of copper nanoparticles is implemented after adjusting the dispersion to the second pH.

22. The method of claim 13, wherein the second pH is between about 7 and about 8.

23. The method of claim 13, wherein the organic capping ligand comprises a mercaptocarboxylic acid.

24. The method of claim 22, wherein the mercaptocarboxylic acid comprises mercaptosuccinic acid.

25. The method of claim 13, wherein the organic capping ligand comprises a thiol group and a carboxyl group.

26. The method of claim 13, wherein the organic capping ligand comprises a hydroxyl group, carboxyl group, an amine group, a thiol group, or any combination thereof.

27. A method of fabricating a conductive wire, the method comprising:

preparing an aramid nanofiber solution in which a matrix of aramid nanofibers are dispersed;

preparing a dispersion of copper nanoparticles, each copper nanoparticle of the dispersion of copper nanoparticles having an organic capping ligand attached to the copper nanoparticle;

injecting the dispersion of copper nanoparticles into a stream of the aramid nanofiber solution to form a composite stream in which copper nanoparticles of the dispersion of metal nanoparticles are incorporated into the matrix of aramid nanofibers such that each incorporated copper nanoparticle is bonded to a respective aramid nanofiber of the matrix of aramid nanofibers via the organic capping ligand to which the copper nanoparticle is attached;

releasing the composite stream into a hydrolyzing solution to form a composite structure; and forming the conductive wire from the composite structure.

28. The method of claim 27, wherein releasing the composite stream comprises injecting the composite stream into a stream of the hydrolyzing solution.

29. The method of claim 27, wherein the hydrolyzing solution comprises a further dispersion of copper nanoparticles.

30. The method of claim 29, wherein the further dispersion of copper nanoparticles is diluted relative to the prepared dispersion of copper nanoparticles.

31. The method of claim 27, wherein forming the conductive wire comprises drawing the conductive wire onto a spool.

* * * * *